(12) United States Patent
Ogata

(10) Patent No.: US 7,268,955 B2
(45) Date of Patent: Sep. 11, 2007

(54) ZOOM LENS AND IMAGER USING THE SAME

(75) Inventor: Yasuzi Ogata, Akiruno (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/407,997

(22) Filed: Apr. 21, 2006

(65) Prior Publication Data

US 2006/0238891 A1    Oct. 26, 2006

(30) Foreign Application Priority Data

Apr. 22, 2005    (JP)    ............................. 2005-125027

(51) Int. Cl.
*G02B 15/14*    (2006.01)
(52) U.S. Cl. ................... 359/690; 359/686; 359/689
(58) Field of Classification Search ................ 359/676, 359/686, 687, 689, 690
See application file for complete search history.

(56) References Cited

U.S. PATENT DOCUMENTS 5,745,300 A    4/1998    Usui et al.
5,760,967 A    6/1998    Terasawa et al.
5,835,282 A    11/1998    Suenaga et al.
6,646,804 B2    11/2003    Harada
6,778,329 B2 *    8/2004    Ozaki .......................... 359/684

FOREIGN PATENT DOCUMENTS

JP    2001-344766 A    12/2001

\* cited by examiner

*Primary Examiner*—Scott J. Sugarman
*Assistant Examiner*—Darryl J. Collins
(74) *Attorney, Agent, or Firm*—Kenyon & Kenyon LLP

(57)    ABSTRACT

The invention is concerned with a zoom lens that is well fit for a digital type single-lens reflex camera, has improved optical performance, and is bright all over the zooming zone. The zoom lens comprises a first group G1 of positive power, a second group G2 of negative power and a third group G3 of positive power. Upon zooming, the first group G1 remains fixed, and the second G2 and the third group G3 are movable. The first group G1 comprises a subgroup 1A of negative power and a subgroup 1B of positive power, and the second group G2 comprises a first negative lens, a cemented positive lens, a second negative lens and a third negative lens. The zoom lens satisfies conditions (1) and (2) with respect to the focal length of the subgroup 1A and the focal length of the second group G2.

14 Claims, 13 Drawing Sheets

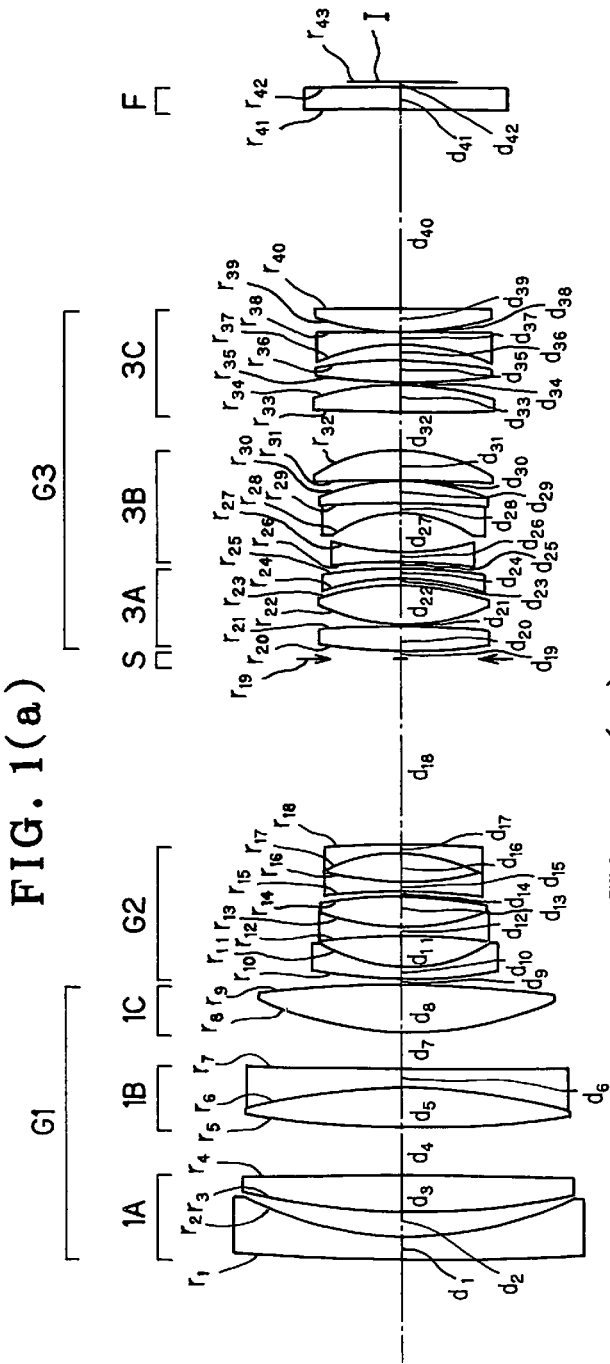
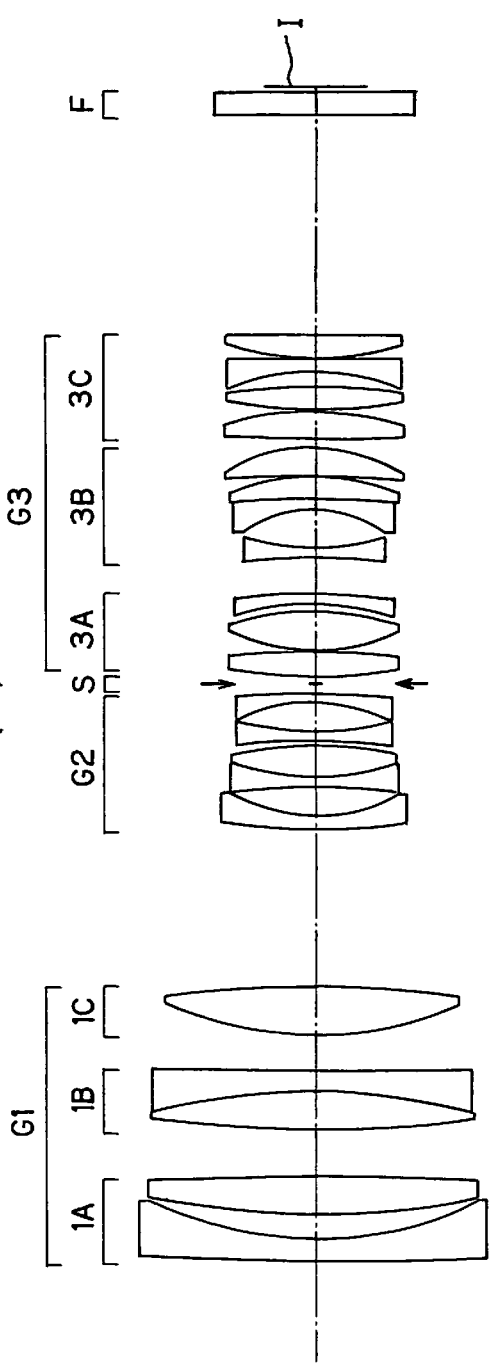
FIG. 1(a)
FIG. 1(b)

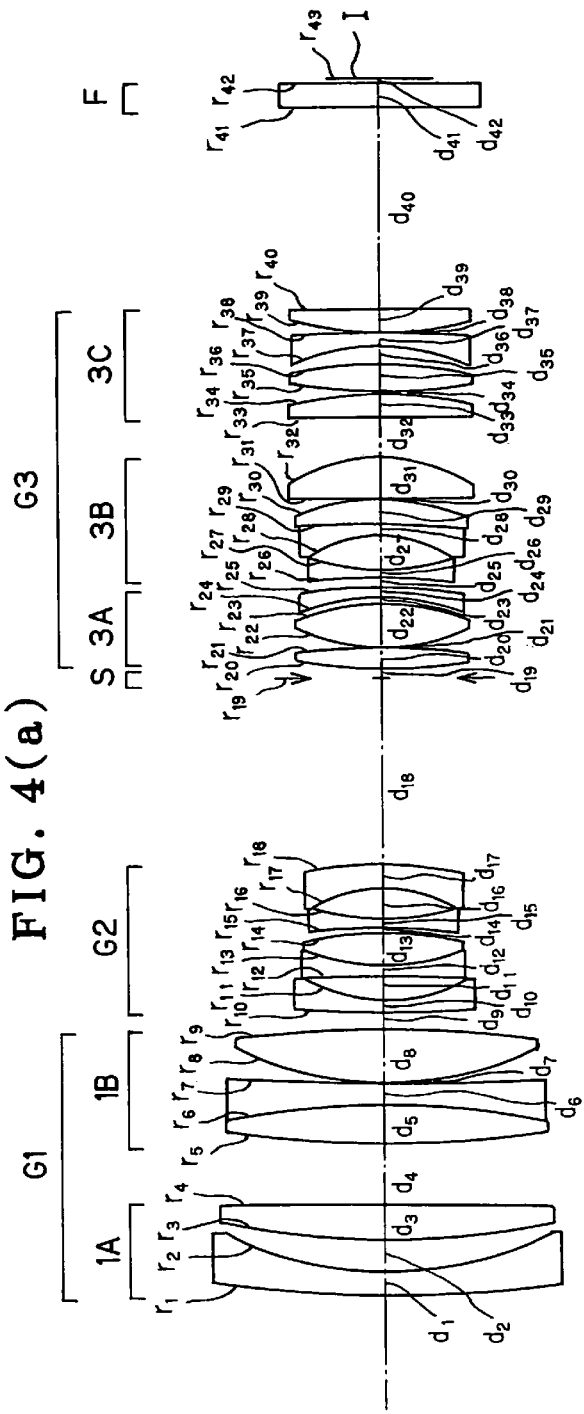
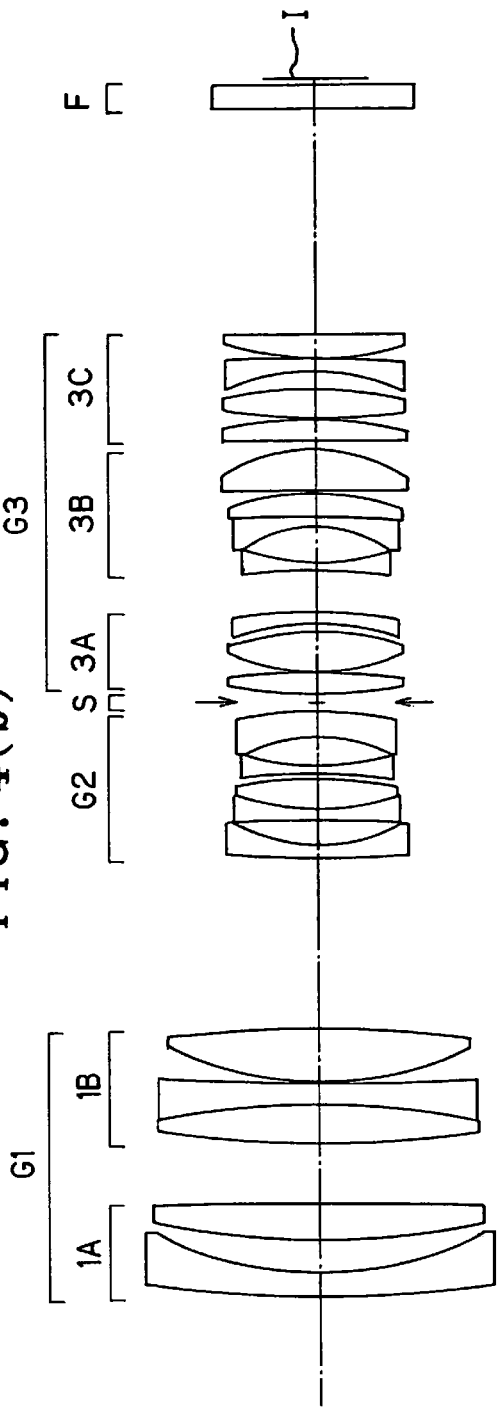
FIG. 4(a)
FIG. 4(b)

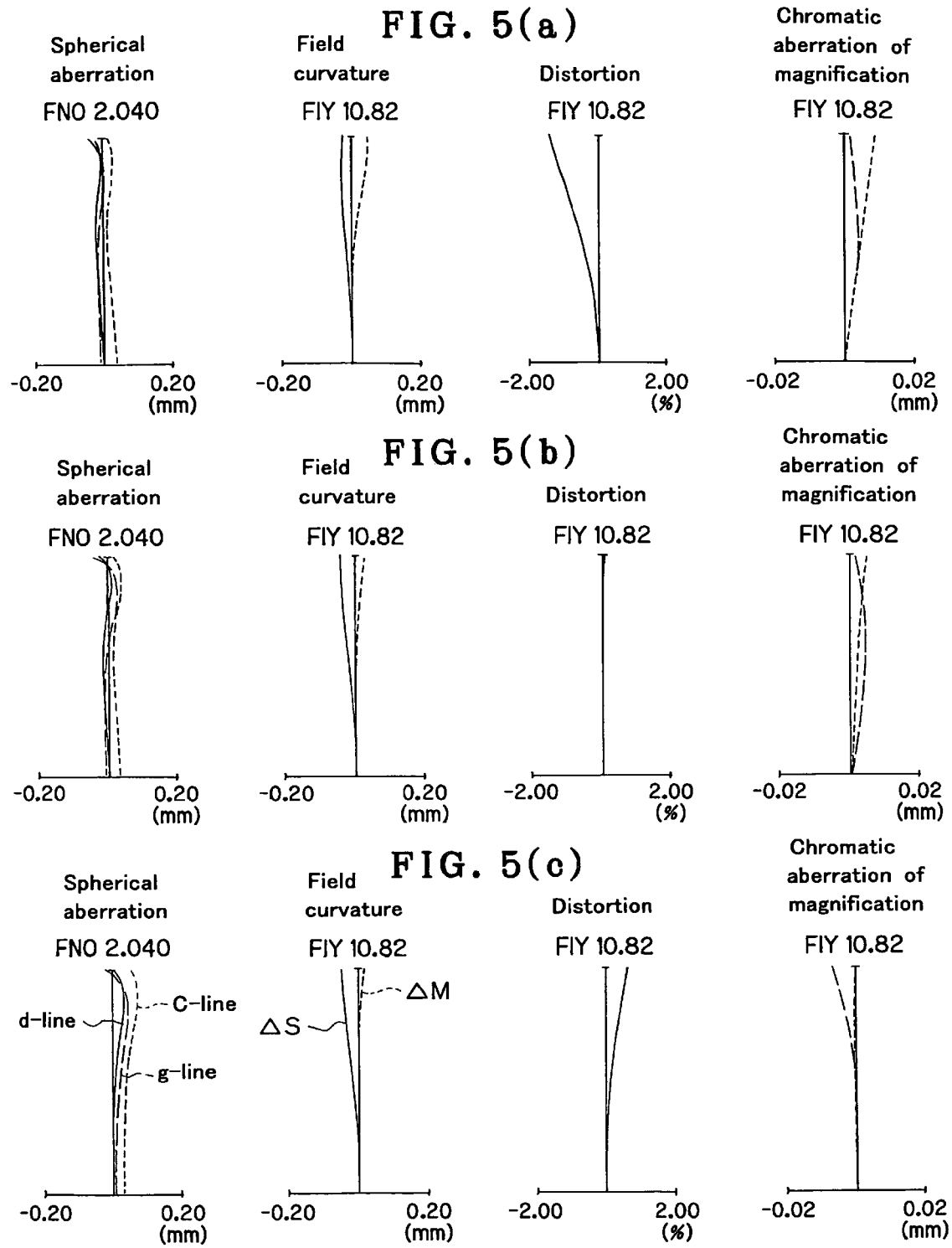

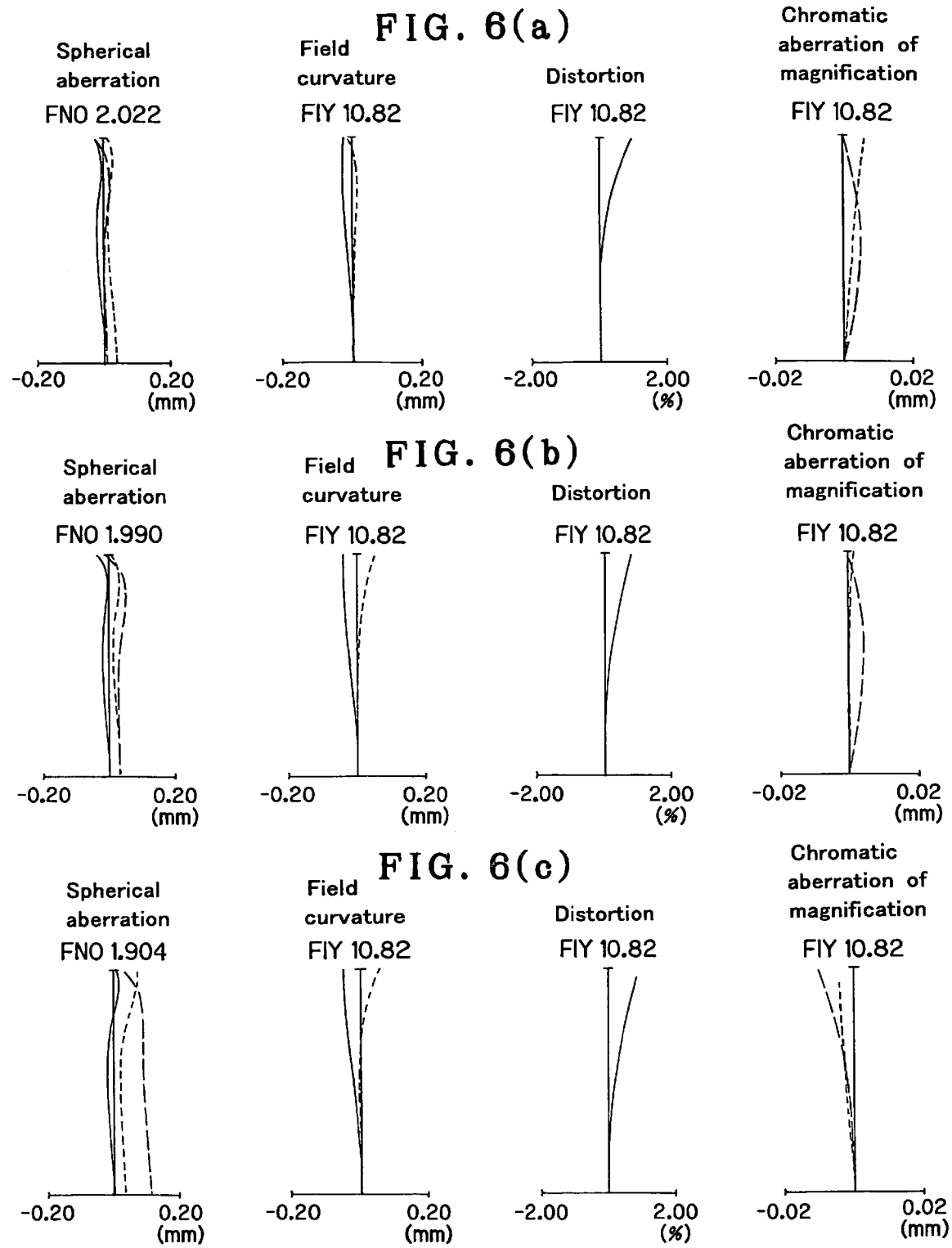

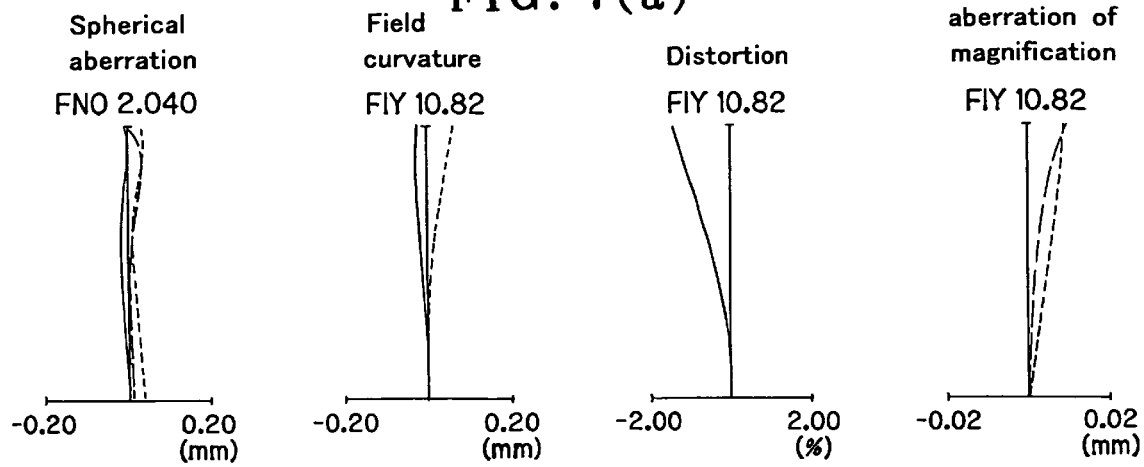
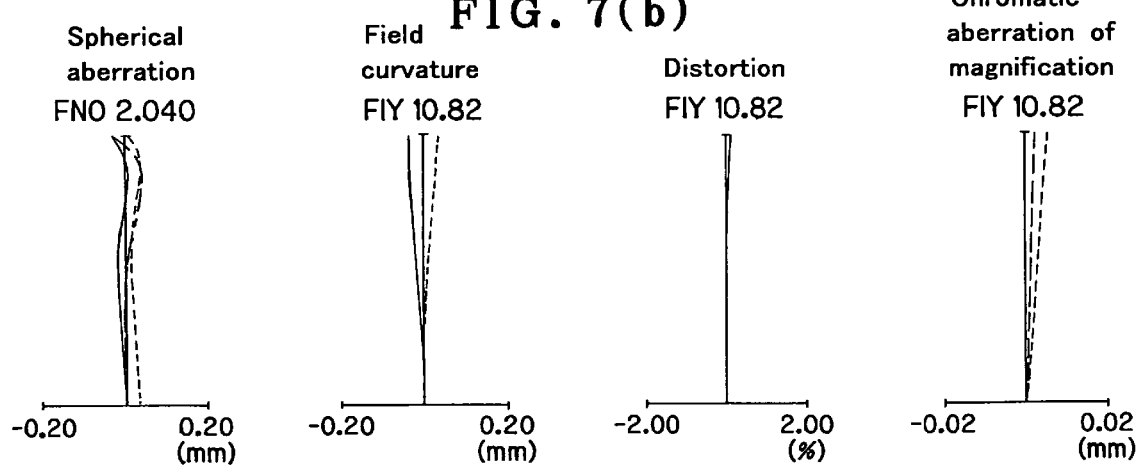
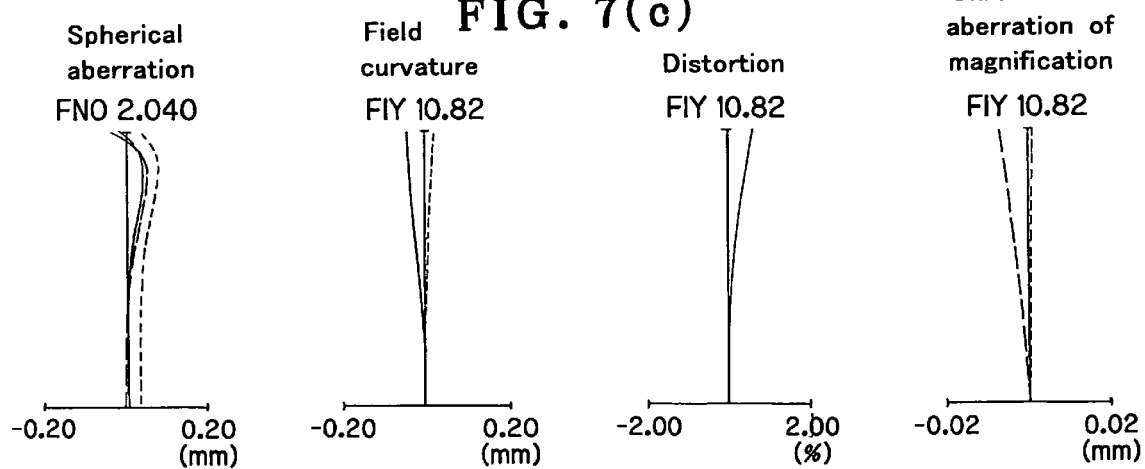

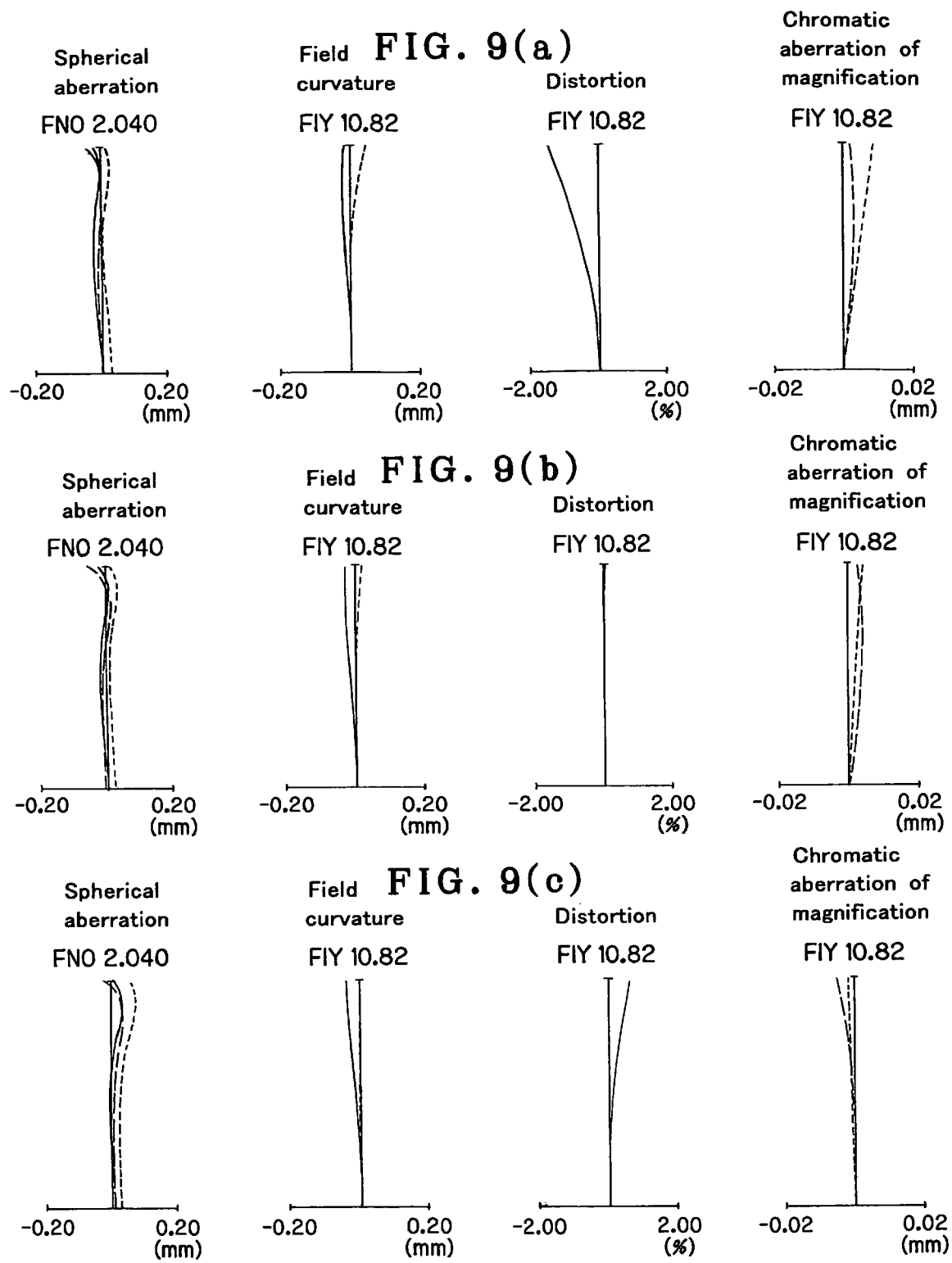

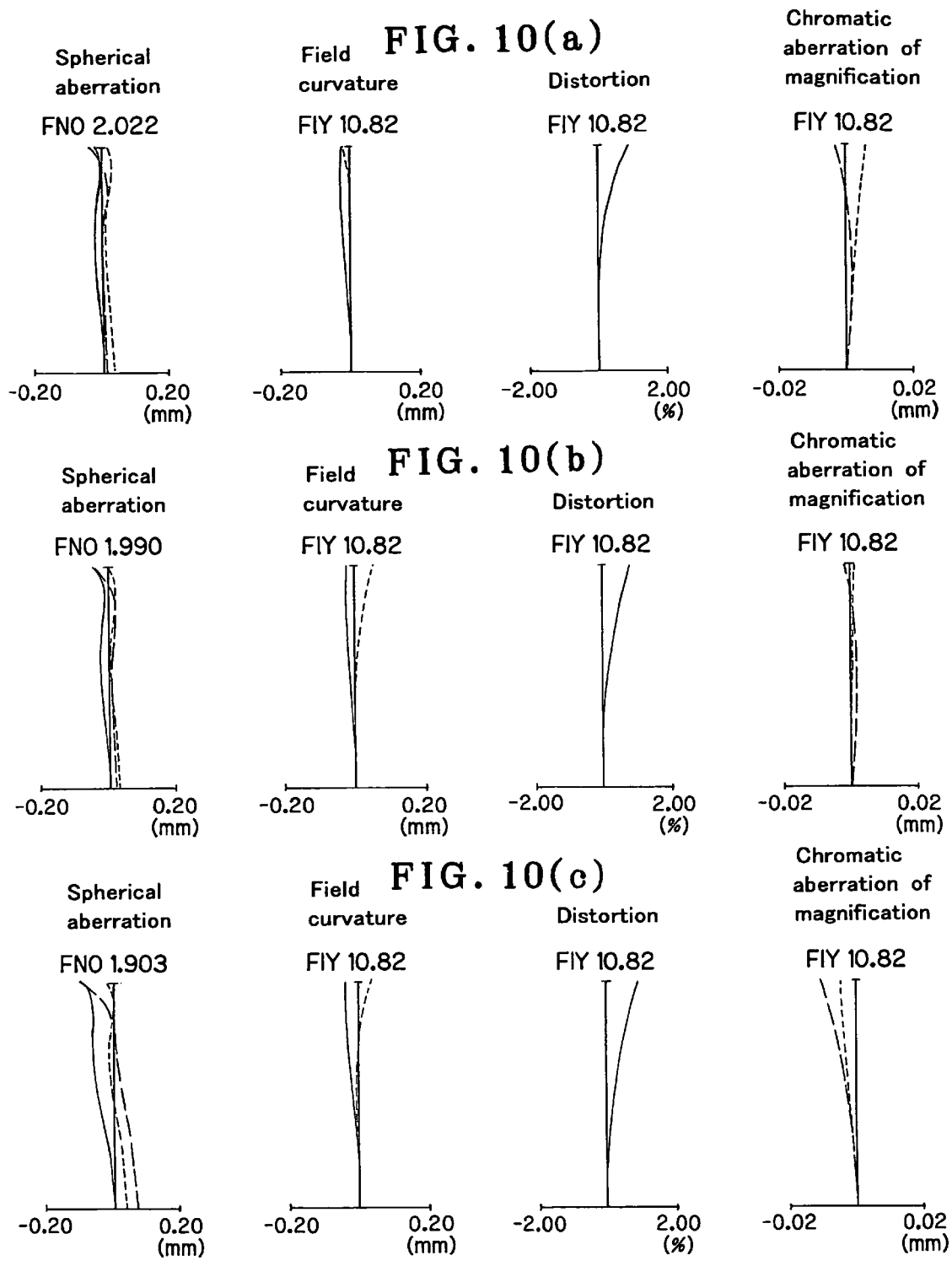

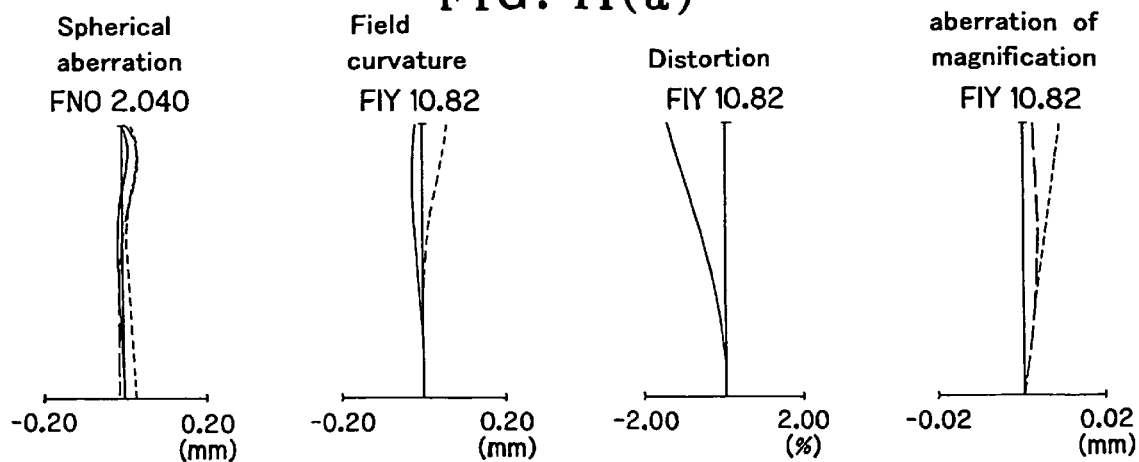
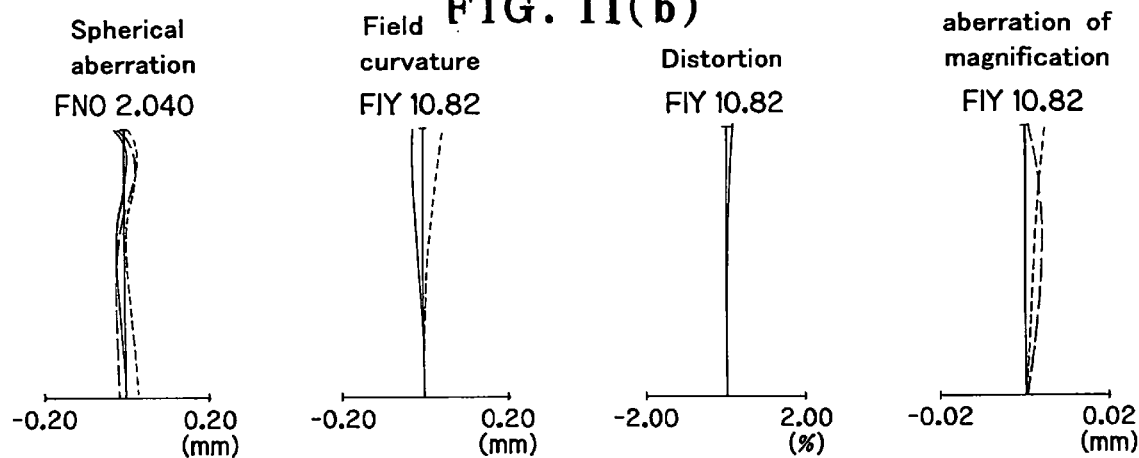
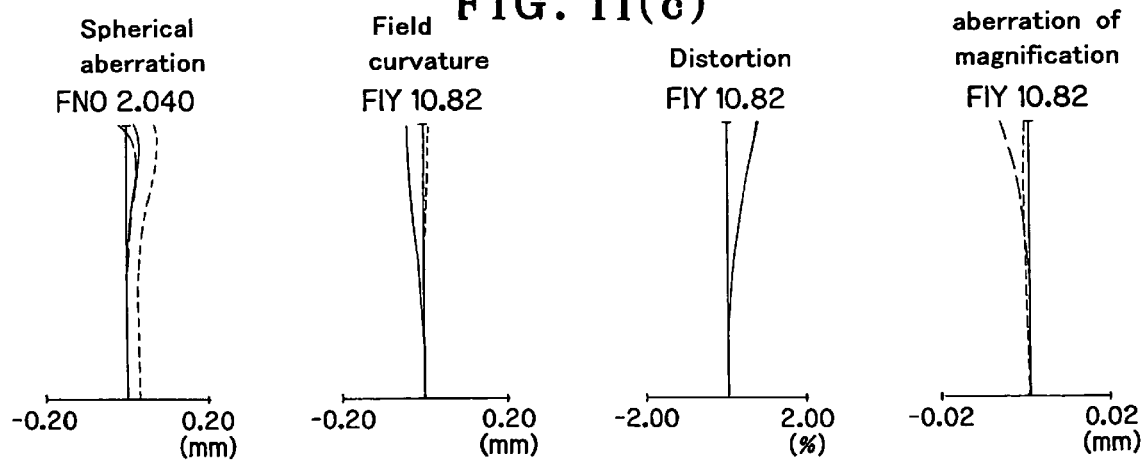

ZOOM LENS AND IMAGER USING THE SAME

This application claims benefit of Japanese Application No. 2005-125027 filed in Japan on Apr. 22, 2005, the contents of which are incorporated by this reference.

BACKGROUND OF THE INVENTION

The present invention relates generally to a zoom lens and an imager incorporating it, and more particularly to a large-aperture zoom lens suitable as an interchangeable lens for digital still cameras of the TTL mode or the like, and an imager using the same.

With recent far-reaching spread of digital cameras, the wave of digitalization has surged toward just only the so-called compact type cameras but also single-lens reflex type cameras. In particular, the sale of low-cost products has triggered rapid popularization of digital cameras among common users. With the digital type single-lens reflex cameras, on the other hand, no consistent imager size has been available as yet; various products have been proposed with every size from the so-called Leica size commonly used with silver-halide types to the so-called APS size to the Four-Thirds size put forward as a new standard. Often, however, print size remains invariable even with decreasing imager size, and so image enlargement magnification becomes inevitably high, resulting in the need of enhancing resolution demanded for lenses. In view of the properties of an imager that as the angle of obliquely incident light grows large, light rays are more susceptible to shading, a lot more care must be taken of the angle of exit of light from a lens. In addition, digital cameras often require monitor observations in which remaining chromatic aberrations or decreased edge brightness are noticeable, and so they must have higher performance than ever before. With decreasing imager size, the focal length of a lens decreases in proportion to the imager size upon bringing the taking angle of view in alignment with the Leica size. Although this works for full lens-size reductions, yet there is difficulty in cutting down the back focus. In turn, this leads to the need of increasing the so-called retro ratio, which, combined with the high-performance requirement, offers a new challenge in connection with lens arrangements.

Thus, a new design different from that for the prior art silver-halide purposes is now needed for an interchangeable lens for the digital type single-lens reflex cameras.

As described later, the present invention provides a lens well fit for such a digital type single-lens reflex camera in general, and a medium-telephoto zoom lens in particular. More specifically, the invention provides an unheard-of large-aperture lens that ensures an F-number of 2 all over the zooming zone. According to the zoom lens of the invention, dark subjects such as night views can be taken with no or little blurring or failure or fast shutter operation can be done for subjects in motion, so that new expressions impossible with the prior art can be made.

Referring here to the prior art, for instance, Patent Publications 1 and 2 show medium-telephoto zoom lenses for silver-halide applications. Each has an angle of view of about 34° to about 12°, and basically comprises a first group of positive power, a second group of negative power, a third group of positive power and a fourth group of positive power wherein the first group is divided into a front subgroup of positive power and a rear subgroup of positive power, and focusing is carried out with the rear subgroup. However, both the zoom lenses have an F-number of about 2.8.

A zoom lens designed to achieve F2 all over the zooming zone, for instance, is set forth in Patent Publication 3. This zoom lens is of the five-group zoom type comprising a first group of positive power, a second group of negative power, a third group of positive power, a fourth group of negative power and a fifth group of positive power. However, the zoom ratio is of the order of 2 with aberrations being not that corrected.

Zoom lenses for high-magnification TV cameras are typically shown in Patent Publications 4 and 5. Each is of the four-group zoom type comprising a first group of positive power, a second group of negative power, a third group of positive or negative power and a fourth group of positive power, wherein the first group is divided into a front subgroup of negative power and a rear subgroup of positive power and, upon focusing on a near distance, the front and the rear subgroup move toward the image side and the object side, respectively, in the case of Publication 4, and the front subgroup remains fixed and the rear subgroup moves toward the object side in the case of Publication 5. Still, each zoom lens is less than satisfactory in terms of correction of aberrations, especially chromatic aberrations at the telephoto end.

List of the Patent Publications

1. JP(A)2002-162564
2. JP(A)2001-344766
3. JP(A)9-325274
4. U.S. Pat. No. 3,063,529
5. U.S. Pat. No. 3,111,766

SUMMARY OF THE INVENTION

In view of such problems with the prior art as described above, the present invention has for its particular object the provision of a zoom lens that is well fit for a digital type of single-lens reflex cameras and is improved in optical performance and fast all over the zooming zone, and an imager incorporating it.

According to the invention, this object is achievable by the provision of a zoom lens, which comprises a first lens group of positive power, a second lens group of negative power and a third lens group of positive power and in which, upon zooming, the first lens group remains fixed and the second lens group and the third lens group are movable, characterized in that:

the first lens group comprises a subgroup 1A of negative power and a subgroup 1B of positive power, and the second lens group comprises a first negative lens, a cemented positive lens, a second negative lens and a third negative lens, with satisfaction of the following conditions:

$$10 < |f_{1A}/f_w| < 50 \qquad (1)$$

$$0.7 < |f_2/f_w| < 1.1 \qquad (2)$$

where $f_{1A}$ is the focal length of the subgroup 1A, $f_2$ is the focal length of the second lens group, and $f_w$ is the focal length of the whole zoom lens at the wide-angle end.

The advantages of, and the requirements for, the zoom lens of the invention are now explained.

Condition (1) is about the power of the subgroup 1A. Ordinarily, a zoom lens used with single-lens reflex cameras or the like must have a sufficiently long back focus at the wide-angle end; so its whole length is likely to increase. With a reduced F-number in mind, light rays at the first lens group gain height, often resulting in an increased lens diameter. To prevent such an optical system from becoming bulky, the invention is designed such that the subgroup 1A is located at the front of the first lens group. As the lower limit of 10 to condition (1) is not reached or the negative power becomes strong, it works for size reductions; however, coma and astigmatism grow too large, rendering correction of aberrations difficult throughout the whole system. As the upper limit 50 is exceeded or the negative power wanes, it causes the diameter of the front lens to become too large for the zoom lens to have any back focus.

Condition (2) is about the power of the second lens group. In the zoom lens of the invention, a substantial part of zooming is carried out by the second lens group, and so there must be some space for movement of the second lens group. As the upper limit of 1.1 to condition (2) is exceeded or the power becomes weak, it is not preferable because there is an increase in the amount of movement on zooming, which would otherwise render the lens system bulky. On the other hand, as the lower limit of 0.7 is not reached or the power becomes strong, the amount of movement decreases and that works for full-length reductions. However, aberration fluctuations on zooming grow too large to be corrected at other lens groups.

The cemented positive lens in the second lens group is desirously made up of a double-concave negative lens and a double-convex positive lens, which are cemented together. For the zoom lens of the invention, correction of chromatic aberrations is of much importance, and unless chromatic aberrations occurring at the second lens group taking a substantial part of zooming are fully corrected, there will be increased chromatic aberration fluctuations on zooming. For satisfactory correction of chromatic aberrations, the cemented positive lens made up of the double-concave negative lens and the double-convex positive lens should be provided. It is then desired to satisfy the following condition (3):

$$20 < \Delta v_2 < 50 \quad (3)$$

where $\Delta v_2$ is an Abbe number difference between the positive lens and the negative lens in the cemented positive lens.

Condition (3) is about the correction of chromatic aberrations at the cementing surface. As the lower limit of 20 is not reached or the Abbe number difference becomes small, it causes the ability of the cementing surface to correct chromatic aberrations to wane, rendering correction of the chromatic aberrations less than satisfactory. As the upper limit of 50 is exceeded, it causes chromatic aberrations occurring at the cementing surface to become excessive, rendering correction of them difficult throughout the whole system.

For the second lens group, it is further desired to satisfy the following condition (4):

$$-0.5 < (r1+r2)/(r1-r2) < 1 \quad (4)$$

where r1 and r2 are the paraxial radii of curvature of the object side- and image side-surfaces of the second negative lens in the second lens group, respectively.

Condition (4) is about the shape of the second negative lens in the second lens group. As described above, the cemented positive lens is provided so as to make correction of chromatic aberrations at the second lens group. This cemented positive lens produces just only chromatic aberrations, but also astigmatism and distortion at the wide-angle end and spherical aberrations and coma at the telephoto end. To properly cancel out those aberrations, the second negative lens should desirously satisfy condition (4) with respect to shape. Here the second negative lens is of double-concave shape, and so correction of aberrations throughout the whole system becomes difficult when there are deviations from both the upper limit of 1 and the lower limit of −0.5 to condition (4).

Desirously, the subgroup 1A of negative power in the first lens group comprises a negative lens and a positive lens which are located with an air separation between them, with satisfaction of the following condition (5):

$$1.48 < n_{d(1AN)} < 1.7 \quad (5)$$

where $n_{d(1N)}$ is the d-line refractive index of the negative lens in the subgroup 1A.

Within the first lens group, spherical aberrations and coma occurring from the subgroup 1B of positive power are corrected at the subgroup 1A of negative power. Desirously to this end, the subgroups 1A is made up of a negative lens and a positive lens with a separation (air separation) between them, and that negative lens has a surface of tight curvature directed to the image side.

Another object of the invention is to achieve a large-aperture, high-performance zoom lens; still, that zoom lens, because of being exclusively a consumer-oriented lens system, must be available at a proper cost. Especially if a high-refractive-index material is used for the negative lens of large lens diameter, much expense will be incurred for material and processing. It is therefore desirous to satisfy condition (5). As the upper limit of 1.7 to condition (5) is exceeded or the refractive index becomes high, it is not preferable because of added costs, although it works for correction of aberrations. On the other hand, as the lower limit of 1.48 is not reached or the refractive index becomes low, it works against correction of chromatic aberrations, because only vitreous materials of tight anomalous dispersion are available.

For the second lens group, it is also desirous to satisfy the following condition (6):

$$1.48 < n_{d(21)} < 1.7 \quad (6)$$

where $n_{d(21)}$ is the d-line refractive index of the first negative lens in the second lens group.

Condition (6) is about the first negative lens in the second lens group, and is provided for the purpose of cost reductions, as is the case with condition (5).

As the upper limit of 1.7 to condition (6) or the refractive index becomes high, it is not preferable because of added cost, although it works for correction of aberrations. On the other hand, as the lower limit of 1.48 is not reached or the refractive index becomes low, it works against correction of chromatic aberrations, because only vitreous materials of tight anomalous dispersion are available.

Desirously, the subgroup 1B of positive power in the first lens group comprises a cemented positive lens made up of a positive lens and a negative lens, and satisfies the following condition (7):

$$20 < \Delta v_{1B} < 40 \quad (7)$$

where $\Delta v_{1B}$ is an Abbe number difference between the positive lens and the negative lens in the cemented positive lens in the subgroup 1B.

Within the first lens group, there is a lot more higher-order chromatic aberration that is canceled out at the cementing surface in the subgroup 1B. As the lower limit of 20 to condition (7) is exceeded, it renders full correction of chromatic aberrations impossible, and as the upper limit of 40 is exceeded, it causes chromatic aberrations occurring at the cementing surface to become too excessive to be corrected throughout the system.

Desirously, the subgroup 1B is made up of a cemented lens of a double-convex lens and a double-concave lens.

Desirously, the third lens group comprises a subgroup 3A of positive power, a subgroup 3B of negative power and a subgroup 3C of positive power, wherein each subgroup is movable upon zooming.

Desirously, the subgroup 3B is designed in such a way as to move upon zooming from the wide-angle end to the telephoto end while the space between it and the subgroup 3C becomes narrow, and satisfies the following condition (8):

$$1.1 < d_{BC}/MC < 1.5 \qquad (8)$$

where $d_{BC}$ is the amount of change in the air separation between the subgroups 3B and 3C at the wide-angle end and the telephoto end, and MC is the amount of movement of the subgroup 3C from the wide-angle end to the telephoto end.

The third lens group takes part in both image formation and image plane correction. In the prior art, the third lens group is often composed of a positive power group or a negative power subgroup and a positive power subgroup; in the invention, however, the third lens group is composed of the subgroup 3A of positive power, the subgroup 3B of negative power and the subgroup 3C of positive power. Especially upon zooming from the wide-angle end to the telephoto end, if the subgroup 3B of negative power moves in such a way as to come close to the subgroup 3C, it is then possible to make full correction of image plane fluctuations on zooming. As the lower limit of 1.1 to condition (8) is not reached, it causes that correction to become insufficient. Exceeding the upper limit of 1.5 is not preferable, because it causes that correction to become excessive and, at the same time, the amount of movement of the subgroup 3B to grow large, resulting in an increase in the whole length.

Desirously, the subgroups 3A and 3C move in unison upon zooming. For simplification of mechanical structure, the subgroups 3A and 3C should move in unison.

Desirously, the subgroup 3A comprises a positive lens, a positive lens and a negative lens. Desirously, the subgroup 3B comprises a negative lens, a cemented negative lens and a positive lens.

Desirously, the subgroup 3C comprises a positive lens, a positive lens, a negative lens and a positive lens.

Desirously in the subgroups 3A, 3B and 3C, at least one positive lens satisfies the following condition (9):

$$70 < v_P \qquad (9)$$

where $v_P$ is the Abbe number of that positive lens.

Condition (9) is about correction of chromatic aberrations. Albeit being of large aperture, the zoom lens of the invention must have high performance. For the zoom lens of the invention, because of being a telephoto system, correction of chromatic aberrations is of much importance. Falling short of the lower limit of 70 to condition (9) is not preferable, because a lot more chromatic aberrations remain.

Optional combinations of the above arrangements or conditions are more effective because synergistic effects are obtainable.

The imager of the invention is characterized by comprising any one of the zoom lenses as described above and an image pickup device located on the image side of the zoom lens.

By doing so, the same advantages as in the zoom lenses as mentioned above are obtainable.

According to the invention as set forth above, it is possible to provide a zoom lens that is well fit for a digital type of single-lens reflex cameras in particular and is improved in optical performance and fast all over the zooming zone, and an imager using the same.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is illustrative in section at the wide-angle end (a) and telephoto end (b) of Example 1 of the inventive zoom lens upon focusing on an object point at infinity.

FIG. 4 is illustrative, as in FIG. 1, of Example 4 of the inventive zoom lens.

FIG. 5 is diagrammatically illustrative of aberrations of Example 1 upon focusing on an object point at infinity.

FIG. 6 is diagrammatically illustrative of aberrations of Example 1 upon focusing on the nearest object point.

FIG. 7 is diagrammatically illustrative of aberrations of Example 2 upon focusing on an object point at infinity.

FIG. 9 is diagrammatically illustrative of aberrations of Example 3 upon focusing on an object point at infinity.

FIG. 10 is diagrammatically illustrative of aberrations of Example 3 upon focusing on the nearest object point.

FIG. 11 is diagrammatically illustrative of aberrations of Example 4 upon focusing on an object point at infinity.

DESCRIPTION OF THE PREFERRED EMBODIMENTS

Examples 1, 2, 3 and 4 of the zoom lens according to the invention are now explained. FIGS. 1 to 4 are illustrative in section at the wide-angle end (a) and telephoto end (b) of Examples 1 to 4 upon focusing on an object point at infinity. Throughout FIGS. 1 to 4, the first lens group is indicated at G1, the subgroup 1A at 1A, the subgroup 1B at 1B, the subgroup 1C at 1C, the second lens group at G2, an aperture stop at S, the third lens group at G3, the subgroup 3A at 3A, the subgroup 3B at 3B, and the subgroup 3C at 3C. F is a plane-parallel plate that forms a low-pass filter with a wavelength-limiting coating applied on it, etc. so as to limit infrared light, and I is an image plane.

Figure 2A:
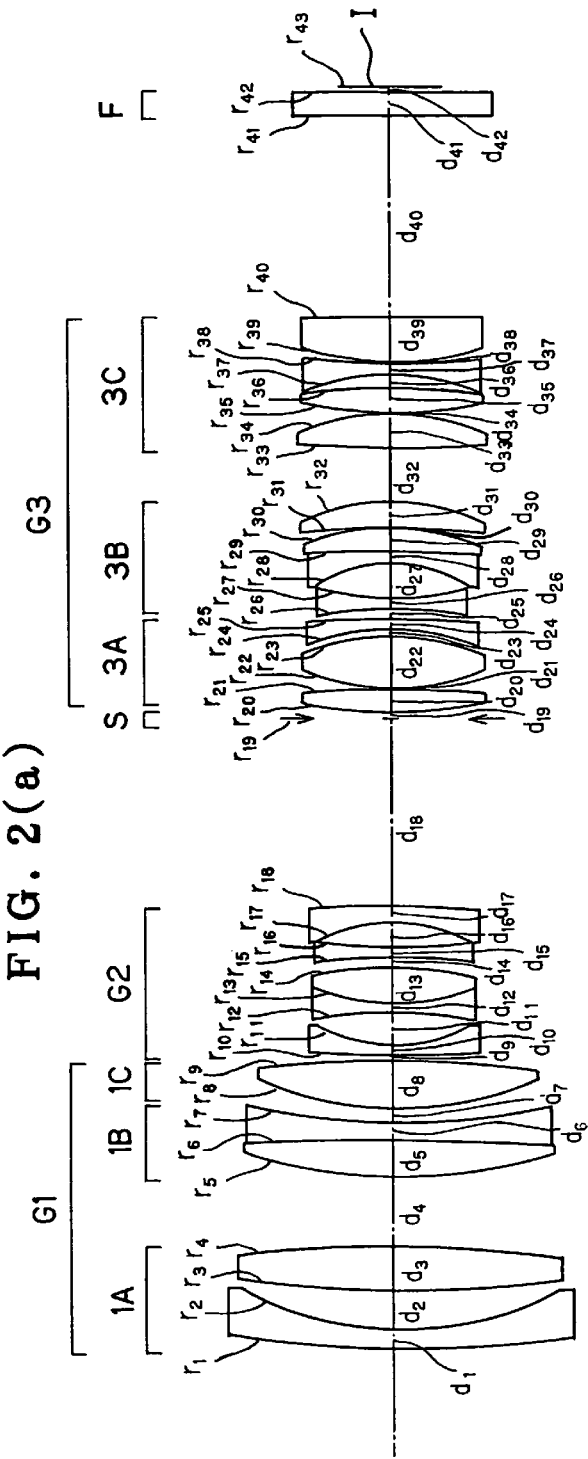
FIG. 2 is illustrative, as in FIG. 1, of Example 2 of the inventive zoom lens.
Figure 2B:
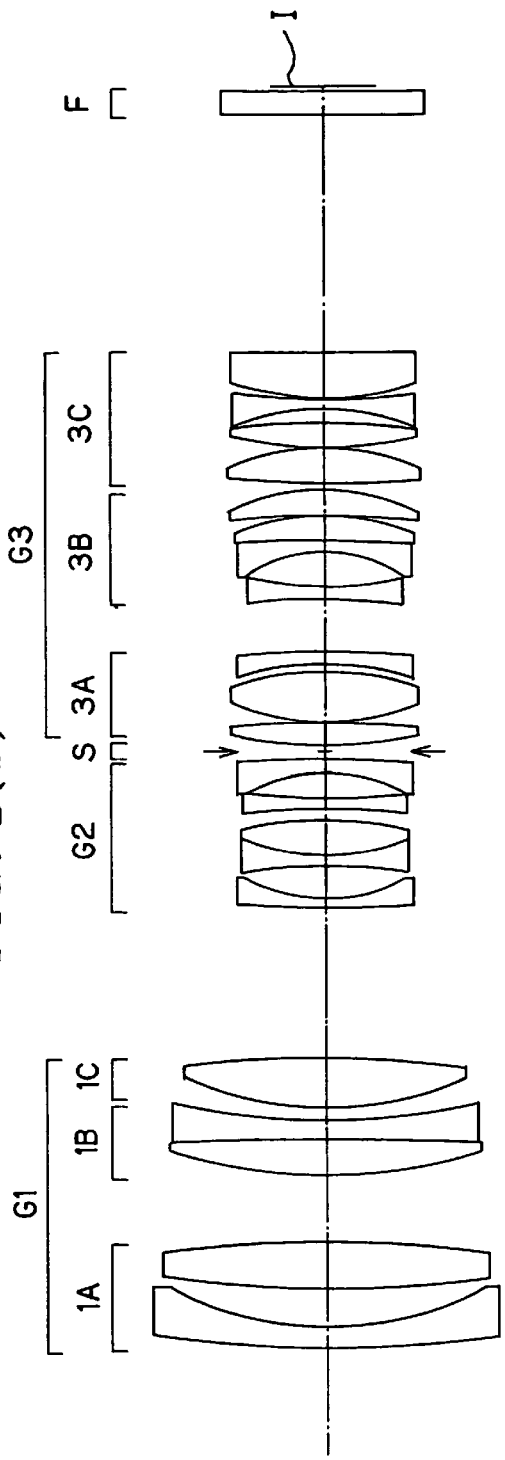
Figure 3A:
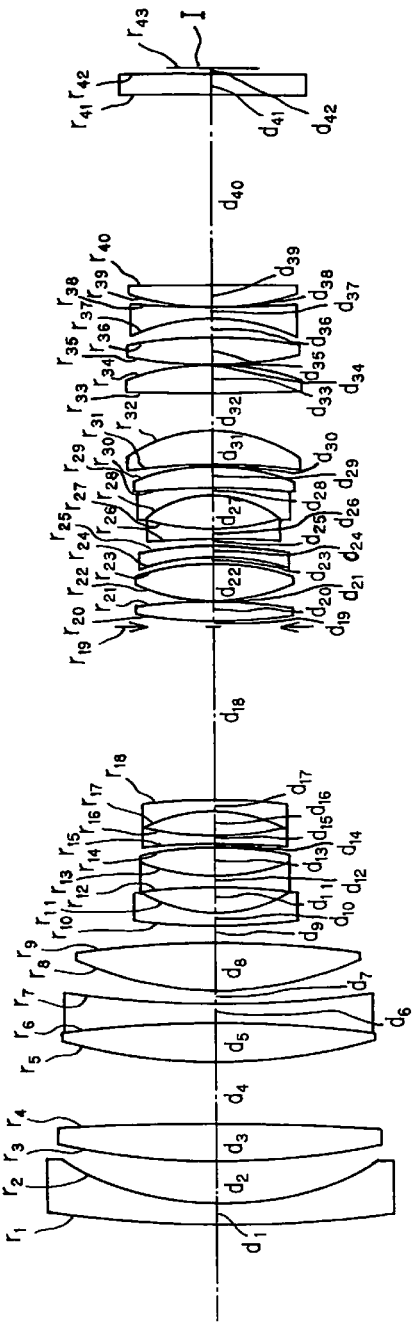
FIG. 3 is illustrative, as in FIG. 1, of Example 3 of the inventive zoom lens.
Figure 3B:
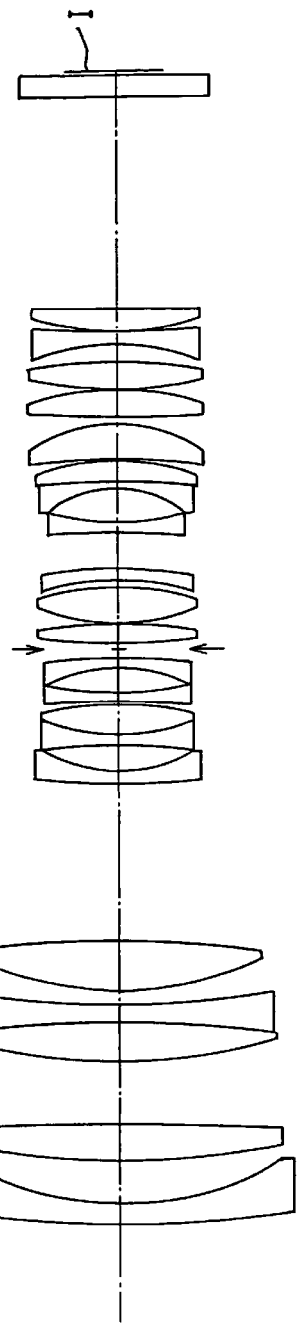
Figure 8A:
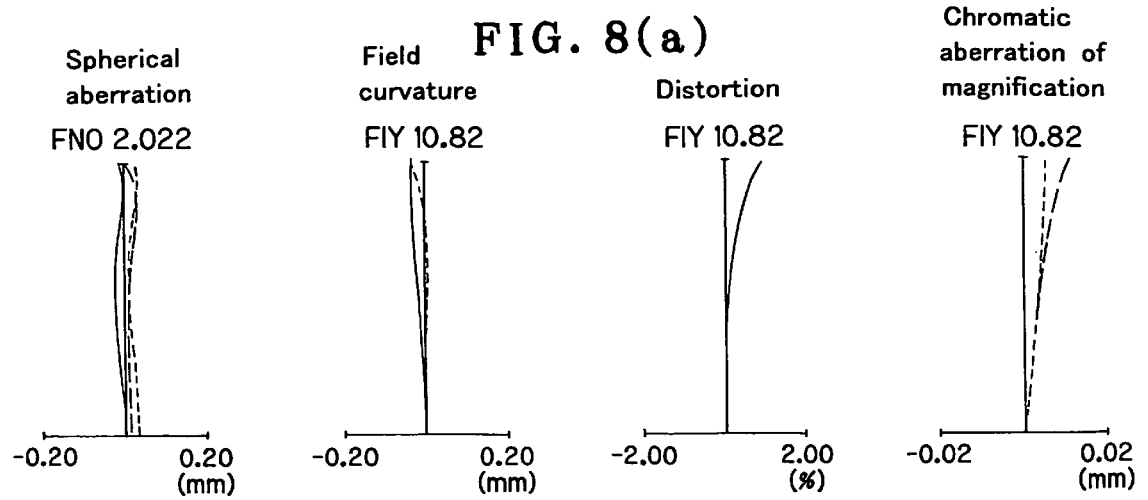
FIG. 8 is diagrammatically illustrative of aberrations of Example 2 upon focusing on the nearest object point.
Figure 8B:
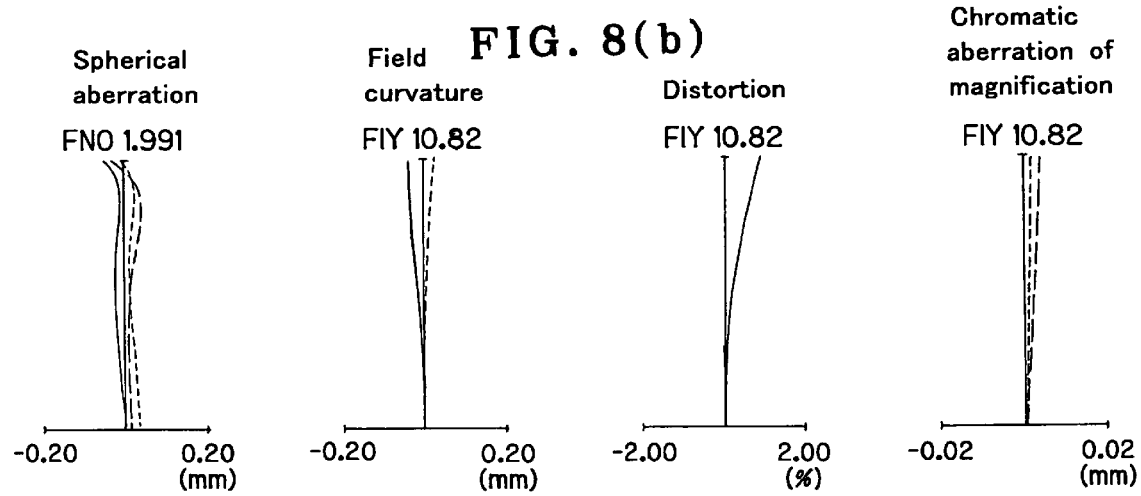
Figure 8C:
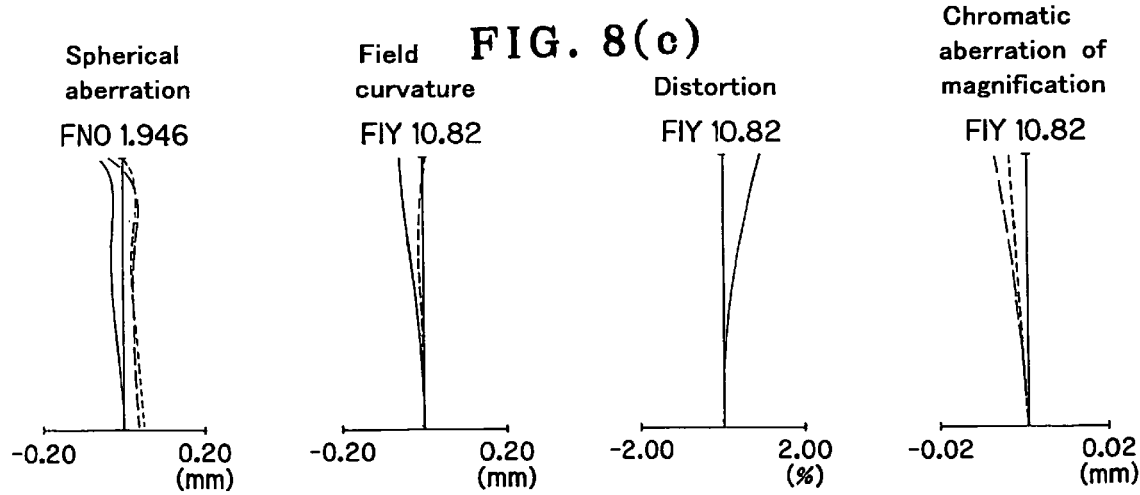
Figure 12A:
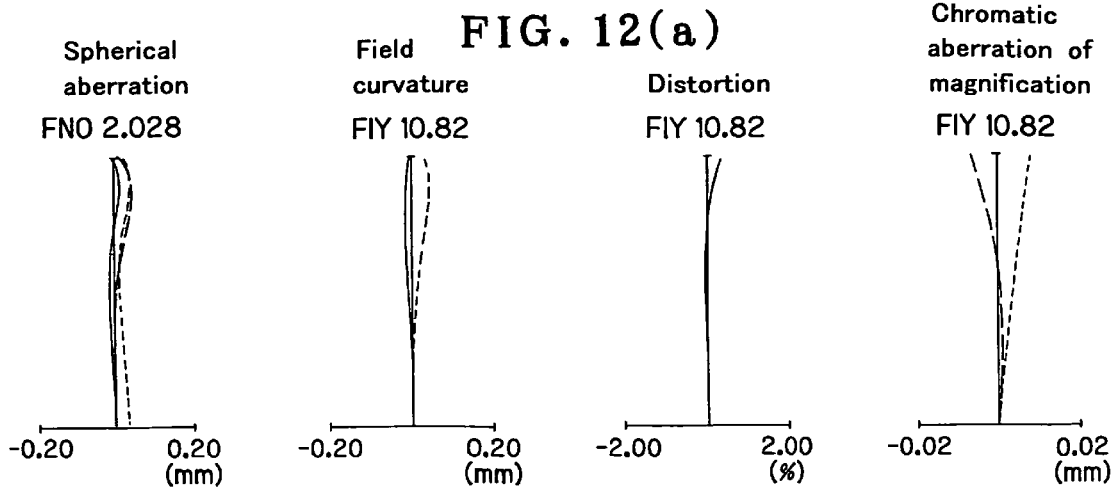
FIG. 12 is diagrammatically illustrative of aberrations of Example 4 upon focusing on the nearest object point.
Figure 12B:
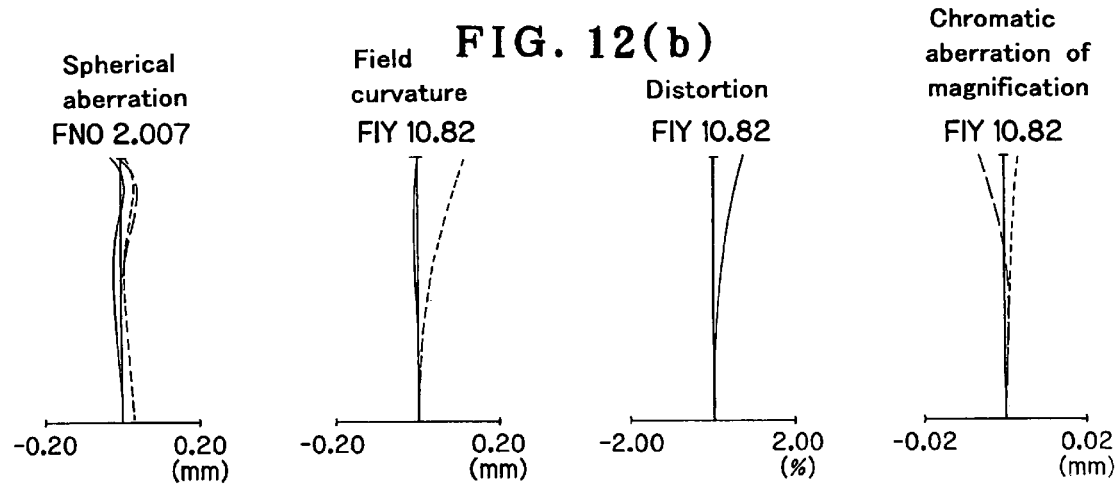
Figure 12C:
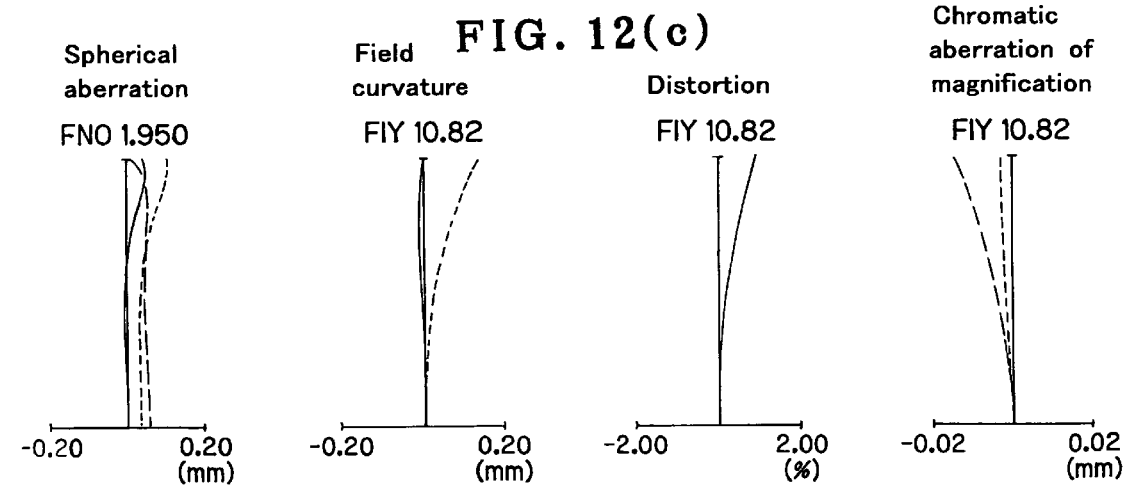

The zoom lenses of Examples 1, 2 and 3 are shown in FIGS. 1, 2 and 3, respectively. Each zoom lens is made up of, in order from the object side, the subgroup 1A composed of a negative meniscus lens concave on its image side and a double-convex positive lens, the subgroup 1B composed of a cemented positive lens consisting of a double-convex positive lens and a double-concave negative lens, the subgroup 1C composed of one double-convex positive lens, the second lens group G2 composed of a negative meniscus lens concave on its image side, a cemented positive lens consisting of a double-concave negative lens and a double-convex positive lens, a double-concave negative lens and a negative meniscus lens concave on its object side, the stop S, the subgroup 3A composed of a double-convex positive lens, a double-convex positive lens and a negative meniscus lens concave on its object side, the subgroup 3B composed of a double-concave negative lens, a cemented negative lens consisting of a negative meniscus lens concave on its object side and a positive meniscus lens convex on its image side and a positive meniscus lens convex on its image side, and the subgroup 3C composed of a double-convex positive lens, a double-convex positive lens, a double-concave negative lens and a plane-convex positive lens. Note here that the lenses are all composed of spherical lenses, and the first lens group G1 of positive power is built up of the subgroups 1A, 1B and 1C while the third lens group G3 of positive power is built up of the subgroups 3A, 3B and 3C.

Upon zooming from the wide-angle end to the telephoto end, the first lens group G1 remains fixed, the second lens group G2 moves monotonously toward the image side, and the subgroups 3A and 3C move together toward the object side and then go back to the image side slightly. The subgroups 3B, too, moves toward the object side, but it then goes back to the image side a lot more than the subgroups 3A and 3C. The stop S moves in unison with the subgroup 3A.

Upon focusing from an infinite object point to the nearest object point, the subgroups 1A, 1B and 1C all move toward the object side, but the space between the subgroups 1A and 1B, and the space between the subgroups 1B and 1C becomes narrow.

As depicted in FIG. 4, the zoom lens of Example 4 is made up of, in order from the object side, the subgroup 1A composed of a negative meniscus lens concave on its image side and a double-convex positive lens, the subgroup 1B composed of a cemented positive lens consisting of a double-convex positive lens and a double-concave negative lens and a double-convex positive lens, the second lens group G2 composed of a negative meniscus lens concave on its image side, a cemented positive lens consisting of a double-concave negative lens and a double-convex positive lens, a double-concave negative lens and a negative meniscus lens concave on its object side, the stop S, the subgroup 3A composed of a double-convex positive lens, a double-convex positive lens and a negative meniscus lens concave on its object side, the subgroup 3B composed of a double-concave negative lens, a cemented negative lens consisting of a negative meniscus lens concave on its object side and a positive meniscus lens convex on its image side and a positive meniscus lens convex on its image side, and the subgroup 3C composed of a double-convex positive lens, a double-convex positive lens, a negative meniscus lens concave on its object side and a plano-convex positive lens. Note here that the lenses are all composed of spherical lenses, and the first lens group G1 of positive power is built up of the subgroups 1A and 1B while the third lens group G3 is built up of the subgroups 3A, 3B and 3C.

Upon zooming from the wide-angle end to the telephoto end, the first lens group G1 remains fixed, the second lens group G2 moves monotonously toward the image side, and the subgroups 3A and 3C move together toward the object side and then go back to the image side slightly. The subgroups 3B, too, moves toward the object side, but it then goes back to the image side a lot more than the subgroups 3A and 3C. The stop S moves in unison with the subgroup 3A.

Upon focusing from an infinite object point to the nearest object point, both the subgroups 1A and 1B move toward the object side, but the space between the subgroups 1A and 1B becomes narrow.

Enumerated below are the numerical data on each example. The symbols used hereinafter but not hereinbefore have the following meanings:

f: the focal length of the whole system, $F_{NO}$: F-number,

2ω: total angle of view,

WE: wide-angle end,

ST: intermediate setting,

TE: telephoto end,

IO: object image distance, $r_1, r_2, \ldots$ : radius of curvature of each lens surface, $d_1, d_2, \ldots$ : space between lens surfaces, $n_{d1}, n_{d2}, \ldots$ : d-line refractive index of each lens, and $\nu_{d1}, \nu_{d2}, \ldots$ : Abbe number of each lens.

EXAMPLE 1 f (mm) = 35.5~59.2~98.5
$F_{NO}$ = 2.04~2.04~2.04
2ω (°) = 34.37~20.70~12.45

| | | | |
|---|---|---|---|
| $r_1$ = 820.7951 | $d_1$ = 4.5 | $n_{d1}$ = 1.51633 | $\nu_{d1}$ = 64.14 |
| $r_2$ = 75.564 | $d_2$ = 5.1817 | | |
| $r_3$ = 166.5114 | $d_3$ = 7.5 | $n_{d2}$ = 1.60311 | $\nu_{d2}$ = 60.64 |
| $r_4$ = −1183.3605 | $d_4$ = (Variable) | | |
| $r_5$ = 224.0176 | $d_5$ = 8.2 | $n_{d3}$ = 1.6779 | $\nu_{d3}$ = 55.34 |
| $r_6$ = −125 | $d_6$ = 4 | $n_{d4}$ = 1.76182 | $\nu_{d4}$ = 26.52 |
| $r_7$ = 1126.5845 | $d_7$ = (Variable) | | |
| $r_8$ = 72.0082 | $d_8$ = 10.0679 | $n_{d5}$ = 1.497 | $\nu_{d5}$ = 81.54 |
| $r_9$ = −229.4539 | $d_9$ = (Variable) | | |
| $r_{10}$ = 117.0783 | $d_{10}$ = 2.4 | $n_{d6}$ = 1.51633 | $\nu_{d6}$ = 64.14 |
| $r_{11}$ = 31.789 | $d_{11}$ = 6.3162 | | |
| $r_{12}$ = −171.8247 | $d_{12}$ = 2.2 | $n_{d7}$ = 1.48749 | $\nu_{d7}$ = 70.23 |
| $r_{13}$ = 49.6003 | $d_{13}$ = 6.5353 | $n_{d8}$ = 1.80518 | $\nu_{d8}$ = 25.42 |
| $r_{14}$ = −78.7899 | $d_{14}$ = 0.7739 | | |
| $r_{15}$ = −138.0585 | $d_{15}$ = 2 | $n_{d9}$ = 1.58313 | $\nu_{d9}$ = 59.38 |
| $r_{16}$ = 60.3472 | $d_{16}$ = 6.1954 | | |
| $r_{17}$ = −34.0638 | $d_{17}$ = 2 | $n_{d10}$ = 1.69895 | $\nu_{d10}$ = 30.13 |
| $r_{18}$ = −153.1042 | $d_{18}$ = (Variable) | | |
| $r_{19}$ = ∞ (Stop) | $d_{19}$ = 1.5 | | |
| $r_{20}$ = 91.9439 | $d_{20}$ = 5.517 | $n_{d11}$ = 1.72916 | $\nu_{d11}$ = 54.68 |
| $r_{21}$ = −158.8693 | $d_{21}$ = 0.2 | | |
| $r_{22}$ = 40.7629 | $d_{22}$ = 8.1245 | $n_{d12}$ = 1.497 | $\nu_{d12}$ = 81.54 |
| $r_{23}$ = −55.9655 | $d_{23}$ = 1.5463 | | |
| $r_{24}$ = −51.1967 | $d_{24}$ = 2.1 | $n_{d13}$ = 1.7495 | $\nu_{d13}$ = 35.28 |
| $r_{25}$ = −116.6645 | $d_{25}$ = (Variable) | | |
| $r_{26}$ = −109.2818 | $d_{26}$ = 1.9 | $n_{d14}$ = 1.62004 | $\nu_{d14}$ = 36.26 |
| $r_{27}$ = 50.872 | $d_{27}$ = 7.9093 | | |
| $r_{28}$ = −24.0531 | $d_{28}$ = 2.1 | $n_{d15}$ = 1.62004 | $\nu_{d15}$ = 36.26 |
| $r_{29}$ = −188.1345 | $d_{29}$ = 4.8 | $n_{d16}$ = 1.80518 | $\nu_{d16}$ = 25.42 |
| $r_{30}$ = −44.5403 | $d_{30}$ = 0.2 | | |
| $r_{31}$ = −166.3752 | $d_{31}$ = 5.9092 | $n_{d17}$ = 1.43875 | $\nu_{d17}$ = 94.93 |
| $r_{32}$ = −32.9776 | $d_{32}$ = (Variable) | | |
| $r_{33}$ = 504.4982 | $d_{33}$ = 5.8182 | $n_{d18}$ = 1.497 | $\nu_{d18}$ = 81.54 |
| $r_{34}$ = −58.8559 | $d_{34}$ = 0.2 | | |
| $r_{35}$ = 105 | $d_{35}$ = 4.8 | $n_{d19}$ = 1.48749 | $\nu_{d19}$ = 70.23 |
| $r_{36}$ = −105 | $d_{36}$ = 2.9316 | | |
| $r_{37}$ = −47.2291 | $d_{37}$ = 2.5 | $n_{d20}$ = 1.801 | $\nu_{d20}$ = 34.97 |
| $r_{38}$ = 650.4356 | $d_{38}$ = 0.2 | | |

-continued

| | | | |
|---|---|---|---|
| $r_{39} = 60.9814$ | $d_{39} = 4.6$ | $n_{d21} = 1.72916$ | $\nu_{d21} = 54.68$ |
| $r_{40} = \infty$ | $d_{40}$ = (Variable) | | |
| $r_{41} = \infty$ | $d_{41} = 4.5$ | $n_{d22} = 1.51633$ | $\nu_{d22} = 64.14$ |
| $r_{42} = \infty$ | $d_{42} = 1$ | | |
| $r_{43} = \infty$ (Image plane) | | | |

| | WE | ST | TE |
|---|---|---|---|
| Zooming Data (IO = $\infty$) | | | |
| f (mm) | 35.5 | 59.2 | 98.5 |
| $d_4$ | 9.67591 | 9.67591 | 9.67591 |
| $d_7$ | 7.69638 | 7.69638 | 7.69638 |
| $d_9$ | 1 | 16.45402 | 33.0783 |
| $d_{18}$ | 38.2695 | 16.96303 | 1.5 |
| $d_{25}$ | 1.52459 | 3.78217 | 7.69904 |
| $d_{32}$ | 7.68136 | 5.42378 | 1.5069 |
| $d_{40}$ | 40.08505 | 45.92751 | 44.74918 |
| Zooming Data (IO = 1.1 m) | | | |
| f (mm) | 35.5 | 59.2 | 98.5 |
| $d_4$ | 1 | 1 | 1 |
| $d_7$ | 1 | 1 | 1 |
| $d_9$ | 16.87229 | 32.32631 | 48.95059 |
| $d_{18}$ | 38.2695 | 16.96303 | 1.5 |
| $d_{25}$ | 1.52459 | 3.78217 | 7.69904 |
| $d_{32}$ | 7.68136 | 5.42378 | 1.5069 |
| $d_{40}$ | 40.08505 | 45.92751 | 44.74918 |

EXAMPLE 2

| | | | |
|---|---|---|---|
| f (mm) = 35.5~59.2~98.5 | | | |
| $F_{NO}$ = 2.04~2.04~2.04 | | | |
| $2\omega$ (°) = 34.37~20.70~12.45 | | | |
| $r_1 = 230.4647$ | $d_1 = 4.5$ | $n_{d1} = 1.51633$ | $\nu_{d1} = 64.14$ |
| $r_2 = 70.3462$ | $d_2 = 7.6347$ | | |
| $r_3 = 254.8872$ | $d_3 = 8.7564$ | $n_{d2} = 1.51633$ | $\nu_{d2} = 64.14$ |
| $r_4 = -342.4924$ | $d_4$ = (Variable) | | |
| $r_5 = 101.4896$ | $d_5 = 7.3363$ | $n_{d3} = 1.6779$ | $\nu_{d3} = 55.34$ |
| $r_6 = -793.0165$ | $d_6 = 4$ | $n_{d4} = 1.76182$ | $\nu_{d4} = 26.52$ |
| $r_7 = 144.5062$ | $d_7$ = (Variable) | | |
| $r_8 = 71.2808$ | $d_8 = 9.75$ | $n_{d5} = 1.497$ | $\nu_{d5} = 81.54$ |
| $r_9 = -216.8724$ | $d_9$ = (Variable) | | |
| $r_{10} = 261.8076$ | $d_{10} = 2.2227$ | $n_{d6} = 1.67003$ | $\nu_{d6} = 47.23$ |
| $r_{11} = 34.5641$ | $d_{11} = 6.2959$ | | |
| $r_{12} = -114.5206$ | $d_{12} = 2.2$ | $n_{d7} = 1.51742$ | $\nu_{d7} = 52.43$ |
| $r_{13} = 46.1393$ | $d_{13} = 7.2039$ | $n_{d8} = 1.78472$ | $\nu_{d8} = 25.68$ |
| $r_{14} = -76.8615$ | $d_{14} = 2.2776$ | | |
| $r_{15} = -134.6644$ | $d_{15} = 2.2454$ | $n_{d9} = 1.7495$ | $\nu_{d9} = 35.28$ |
| $r_{16} = 146.9013$ | $d_{16} = 4.6689$ | | |
| $r_{17} = -34.2611$ | $d_{17} = 3.376$ | $n_{d10} = 1.48749$ | $\nu_{d10} = 70.23$ |
| $r_{18} = -252.7804$ | $d_{18}$ = (Variable) | | |
| $r_{19} = \infty$ (Stop) | $d_{19} = 1.5$ | | |
| $r_{20} = 91.3676$ | $d_{20} = 4.6212$ | $n_{d11} = 1.72916$ | $\nu_{d11} = 54.68$ |
| $r_{21} = -196.8329$ | $d_{21} = 0.112$ | | |
| $r_{22} = 48.7795$ | $d_{22} = 10.3931$ | $n_{d12} = 1.497$ | $\nu_{d12} = 81.54$ |
| $r_{23} = -54.0172$ | $d_{23} = 1.518$ | | |
| $r_{24} = -50.4396$ | $d_{24} = 2.5$ | $n_{d13} = 1.68893$ | $\nu_{d13} = 31.07$ |
| $r_{25} = -174.4774$ | $d_{25}$ = (Variable) | | |
| $r_{26} = -128.4933$ | $d_{26} = 2.5084$ | $n_{d14} = 1.62004$ | $\nu_{d14} = 36.26$ |
| $r_{27} = 65.4196$ | $d_{27} = 6.9346$ | | |
| $r_{28} = -27.2588$ | $d_{28} = 2.5$ | $n_{d15} = 1.62004$ | $\nu_{d15} = 36.26$ |
| $r_{29} = -276.0557$ | $d_{29} = 4.8512$ | $n_{d16} = 1.80518$ | $\nu_{d16} = 25.42$ |
| $r_{30} = -47.6494$ | $d_{30} = 0.1021$ | | |
| $r_{31} = -151.3743$ | $d_{31} = 5.0693$ | $n_{d17} = 1.497$ | $\nu_{d17} = 81.54$ |
| $r_{32} = -43.0894$ | $d_{32}$ = (Variable) | | |
| $r_{33} = 261.1296$ | $d_{33} = 6.7533$ | $n_{d18} = 1.497$ | $\nu_{d18} = 81.54$ |
| $r_{34} = -48.8666$ | $d_{34} = 0.2$ | | |
| $r_{35} = 84.3111$ | $d_{35} = 4.9058$ | $n_{d19} = 1.48749$ | $\nu_{d19} = 70.23$ |
| $r_{36} = -173.3058$ | $d_{36} = 2.4696$ | | |
| $r_{37} = -50.3376$ | $d_{37} = 2.5672$ | $n_{d20} = 1.801$ | $\nu_{d20} = 34.97$ |
| $r_{38} = 182.7879$ | $d_{38} = 0.2$ | | |

-continued

| | | | |
|---|---|---|---|
| $r_{39} = 59.7671$ | $d_{39} = 9.1154$ | $n_{d21} = 1.72916$ | $\nu_{d21} = 54.68$ |
| $r_{40} = \infty$ | $d_{40}$ = (Variable) | | |
| $r_{41} = \infty$ | $d_{41} = 4.5$ | $n_{d22} = 1.51633$ | $\nu_{d22} = 64.14$ |
| $r_{42} = \infty$ | $d_{42} = 1$ | | |
| $r_{43} = \infty$ (Image plane) | | | |

| | WE | ST | TE |
|---|---|---|---|
| Zooming Data (IO = $\infty$) | | | |
| f (mm) | 35.5 | 59.2 | 98.5 |
| $d_4$ | 14.14114 | 14.14114 | 14.14114 |
| $d_7$ | 2.64224 | 2.64224 | 2.64224 |
| $d_9$ | 1 | 15.7081 | 30.79632 |
| $d_{18}$ | 38.53468 | 17.12815 | 1.5 |
| $d_{25}$ | 1.66216 | 4.93999 | 10.90659 |
| $d_{32}$ | 10.77598 | 7.49814 | 1.53155 |
| $d_{40}$ | 40.09922 | 46.79775 | 47.33782 |
| Zooming Data (IO = 1.1 m) | | | |
| f (mm) | 35.5 | 59.2 | 98.5 |
| $d_4$ | 2.3 | 2.3 | 2.3 |
| $d_7$ | 0.1 | 0.1 | 0.1 |
| $d_9$ | 15.69276 | 30.40086 | 45.48908 |
| $d_{18}$ | 38.53468 | 17.12815 | 1.5 |
| $d_{25}$ | 1.66216 | 4.93999 | 10.90659 |
| $d_{32}$ | 10.77598 | 7.49814 | 1.53155 |
| $d_{40}$ | 40.09922 | 46.79775 | 47.33782 |

EXAMPLE 3

| | | | |
|---|---|---|---|
| f (mm) = 35.5~59.2~98.5 | | | |
| $F_{NO}$ = 2.04~2.04~2.04 | | | |
| $2\omega$ (°) = 34.37~20.70~12.45 | | | |
| $r_1 = 313.8082$ | $d_1 = 4.5$ | $n_{d1} = 1.51633$ | $\nu_{d1} = 64.14$ |
| $r_2 = 72.6405$ | $d_2 = 9.2208$ | | |
| $r_3 = 195.1728$ | $d_3 = 7.5$ | $n_{d2} = 1.60311$ | $\nu_{d2} = 60.64$ |
| $r_4 = -672.762$ | $d_4$ = (Variable) | | |
| $r_5 = 130.8382$ | $d_5 = 8.2$ | $n_{d3} = 1.6779$ | $\nu_{d3} = 55.34$ |
| $r_6 = -273.3399$ | $d_6 = 4$ | $n_{d4} = 1.76182$ | $\nu_{d4} = 26.52$ |
| $r_7 = 202.8899$ | $d_7$ = (Variable) | | |
| $r_8 = 73.2742$ | $d_8 = 10.7436$ | $n_{d5} = 1.497$ | $\nu_{d5} = 81.54$ |
| $r_9 = -216.3256$ | $d_9$ = (Variable) | | |
| $r_{10} = 196.661$ | $d_{10} = 2.4$ | $n_{d6} = 1.51633$ | $\nu_{d6} = 64.14$ |
| $r_{11} = 30.894$ | $d_{11} = 6.0148$ | | |
| $r_{12} = -125.5495$ | $d_{12} = 2.2$ | $n_{d7} = 1.48749$ | $\nu_{d7} = 70.23$ |
| $r_{13} = 48.1609$ | $d_{13} = 6.4793$ | $n_{d8} = 1.80518$ | $\nu_{d8} = 25.42$ |
| $r_{14} = -78.72$ | $d_{14} = 0.5488$ | | |
| $r_{15} = -217.4463$ | $d_{15} = 2$ | $n_{d9} = 1.713$ | $\nu_{d9} = 53.87$ |
| $r_{16} = 72.6957$ | $d_{16} = 5.287$ | | |
| $r_{17} = -33.7543$ | $d_{17} = 2.5724$ | $n_{d10} = 1.69895$ | $\nu_{d10} = 30.13$ |
| $r_{18} = -109.8588$ | $d_{18}$ = (Variable) | | |
| $r_{19} = \infty$ (Stop) | $d_{19} = 1.5$ | | |
| $r_{20} = 114.8984$ | $d_{20} = 4$ | $n_{d11} = 1.72916$ | $\nu_{d11} = 54.68$ |
| $r_{21} = -152.555$ | $d_{21} = 0.2$ | | |
| $r_{22} = 42.4833$ | $d_{22} = 8.3291$ | $n_{d12} = 1.497$ | $\nu_{d12} = 81.54$ |
| $r_{23} = -52.2912$ | $d_{23} = 1.5213$ | | |
| $r_{24} = -48.6852$ | $d_{24} = 2.1$ | $n_{d13} = 1.7495$ | $\nu_{d13} = 35.28$ |
| $r_{25} = -107.1729$ | $d_{25}$ = (Variable) | | |
| $r_{26} = -115.504$ | $d_{26} = 1.9$ | $n_{d14} = 1.62004$ | $\nu_{d14} = 36.26$ |
| $r_{27} = 59.991$ | $d_{27} = 7.0656$ | | |
| $r_{28} = -23.8258$ | $d_{28} = 2.1$ | $n_{d15} = 1.62004$ | $\nu_{d15} = 36.26$ |
| $r_{29} = -130.1579$ | $d_{29} = 4.8$ | $n_{d16} = 1.80518$ | $\nu_{d16} = 25.42$ |
| $r_{30} = -43.4686$ | $d_{30} = 0.2$ | | |
| $r_{31} = -129.709$ | $d_{31} = 7.2073$ | $n_{d17} = 1.43875$ | $\nu_{d17} = 94.93$ |
| $r_{32} = -33.0039$ | $d_{32}$ = (Variable) | | |
| $r_{33} = 497.273$ | $d_{33} = 5.8504$ | $n_{d18} = 1.497$ | $\nu_{d18} = 81.54$ |
| $r_{34} = -63.2685$ | $d_{34} = 0.2$ | | |
| $r_{35} = 88.062$ | $d_{35} = 5.9818$ | $n_{d19} = 1.497$ | $\nu_{d19} = 81.54$ |
| $r_{36} = -111.587$ | $d_{36} = 3.4751$ | | |
| $r_{37} = -49.021$ | $d_{37} = 2.5$ | $n_{d20} = 1.7495$ | $\nu_{d20} = 35.28$ |
| $r_{38} = 200.434$ | $d_{38} = 0.2$ | | |

-continued

| | | | |
|---|---|---|---|
| $r_{39} = 59.3242$ | $d_{39} = 4.6$ | $n_{d21} = 1.7432$ | $\nu_{d21} = 49.34$ |
| $r_{40} = \infty$ | $d_{40}$ = (Variable) | | |
| $r_{41} = \infty$ | $d_{41} = 4.5$ | $n_{d22} = 1.51633$ | $\nu_{d22} = 64.14$ |
| $r_{42} = \infty$ | $d_{42} = 1$ | | |
| $r_{43} = \infty$ (Image plane) | | | |

| | WE | ST | TE |
|---|---|---|---|
| Zooming Data (IO = ∞) | | | |
| f (mm) | 35.5 | 59.2 | 98.5 |
| $d_4$ | 13.67432 | 13.67432 | 13.67432 |
| $d_7$ | 3.10952 | 3.10952 | 3.10952 |
| $d_9$ | 3.8 | 18.87409 | 34.95436 |
| $d_{18}$ | 37.66545 | 16.68848 | 1.5 |
| $d_{25}$ | 1.89124 | 4.27802 | 8.3678 |
| $d_{32}$ | 7.97657 | 5.58979 | 1.5 |
| $d_{40}$ | 40.10912 | 46.00909 | 45.0989 |
| Zooming Data (IO = 1.1 m) | | | |
| f (mm) | 35.5 | 59.2 | 98.5 |
| $d_4$ | 1 | 1 | 1 |
| $d_7$ | 1 | 1 | 1 |
| $d_9$ | 19.08384 | 34.15793 | 50.2382 |
| $d_{18}$ | 37.66545 | 16.68848 | 1.5 |
| $d_{25}$ | 1.89124 | 4.27802 | 8.3678 |
| $d_{32}$ | 7.97657 | 5.58979 | 1.5 |
| $d_{40}$ | 40.10912 | 46.00909 | 45.09895 |

EXAMPLE 4 f (mm) = 35.5~59.2~98.5
$F_{NO}$ = 2.04~2.04~2.04
2ω (°) = 34.37~20.70~12.45

| | | | |
|---|---|---|---|
| $r_1 = 294.7069$ | $d_1 = 4.5$ | $n_{d1} = 1.51633$ | $\nu_{d1} = 64.14$ |
| $r_2 = 73.605$ | $d_2 = 6.659$ | | |
| $r_3 = 176.9569$ | $d_3 = 7.2$ | $n_{d2} = 1.60311$ | $\nu_{d2} = 60.64$ |
| $r_4 = -1692.8812$ | $d_4$ = (Variable) | | |
| $r_5 = 206.7398$ | $d_5 = 8.2$ | $n_{d3} = 1.6779$ | $\nu_{d3} = 55.34$ |
| $r_6 = -150.6413$ | $d_6 = 4$ | $n_{d4} = 1.76182$ | $\nu_{d4} = 26.52$ |
| $r_7 = 526.4049$ | $d_7 = 0.2$ | | |
| $r_8 = 70.0284$ | $d_8 = 10.819$ | $n_{d5} = 1.497$ | $\nu_{d5} = 81.54$ |
| $r_9 = -247.369$ | $d_9$ = (Variable) | | |
| $r_{10} = 365.846$ | $d_{10} = 2.4$ | $n_{d6} = 1.51633$ | $\nu_{d6} = 64.14$ |
| $r_{11} = 33.5333$ | $d_{11} = 5.0899$ | | |
| $r_{12} = -483.2895$ | $d_{12} = 2.2$ | $n_{d7} = 1.48749$ | $\nu_{d7} = 70.23$ |
| $r_{13} = 49.2289$ | $d_{13} = 6.4473$ | $n_{d8} = 1.80518$ | $\nu_{d8} = 25.42$ |
| $r_{14} = -77.7269$ | $d_{14} = 0.7356$ | | |
| $r_{15} = -145.6193$ | $d_{15} = 2$ | $n_{d9} = 1.713$ | $\nu_{d9} = 53.87$ |
| $r_{16} = 57.5197$ | $d_{16} = 5.8007$ | | |
| $r_{17} = -31.2654$ | $d_{17} = 5.1715$ | $n_{d10} = 1.69895$ | $\nu_{d10} = 30.13$ |
| $r_{18} = -83.4383$ | $d_{18}$ = (Variable) | | |
| $r_{19} = \infty$ (Stop) | $d_{19} = 2$ | | |
| $r_{20} = 107.8266$ | $d_{20} = 4$ | $n_{d11} = 1.72916$ | $\nu_{d11} = 54.68$ |
| $r_{21} = -163.6507$ | $d_{21} = 0.2$ | | |
| $r_{22} = 41.3947$ | $d_{22} = 8.5699$ | $n_{d12} = 1.497$ | $\nu_{d12} = 81.54$ |
| $r_{23} = -56.3516$ | $d_{23} = 1.5494$ | | |
| $r_{24} = -51.7375$ | $d_{24} = 2.1$ | $n_{d13} = 1.7495$ | $\nu_{d13} = 35.28$ |
| $r_{25} = -110.7758$ | $d_{25}$ = (Variable) | | |
| $r_{26} = -126.408$ | $d_{26} = 1.9$ | $n_{d14} = 1.62004$ | $\nu_{d14} = 36.26$ |
| $r_{27} = 55.6482$ | $d_{27} = 7.1386$ | | |
| $r_{28} = -25.213$ | $d_{28} = 2.1$ | $n_{d15} = 1.62004$ | $\nu_{d15} = 36.26$ |
| $r_{29} = -162.4763$ | $d_{29} = 4.8$ | $n_{d16} = 1.80518$ | $\nu_{d16} = 25.42$ |
| $r_{30} = -47.9498$ | $d_{30} = 0.2$ | | |
| $r_{31} = -805.7123$ | $d_{31} = 8.2176$ | $n_{d17} = 1.43875$ | $\nu_{d17} = 94.93$ |
| $r_{32} = -34.9001$ | $d_{32}$ = (Variable) | | |
| $r_{33} = 4053.4647$ | $d_{33} = 4.7033$ | $n_{d18} = 1.497$ | $\nu_{d18} = 81.54$ |
| $r_{34} = -77.3059$ | $d_{34} = 0.2$ | | |
| $r_{35} = 129.5582$ | $d_{35} = 5.6286$ | $n_{d19} = 1.497$ | $\nu_{d19} = 81.54$ |
| $r_{36} = -90.5978$ | $d_{36} = 3.4846$ | | |
| $r_{37} = -44.1072$ | $d_{37} = 2.5$ | $n_{d20} = 1.7495$ | $\nu_{d20} = 35.28$ |
| $r_{38} = -814.7874$ | $d_{38} = 0.2$ | | |
| $r_{39} = 67.201$ | $d_{39} = 4.6$ | $n_{d21} = 1.7432$ | $\nu_{d21} = 49.34$ |
| $r_{40} = \infty$ | $d_{40}$ = (Variable) | | |
| $r_{41} = \infty$ | $d_{41} = 4.5$ | $n_{d22} = 1.51633$ | $\nu_{d22} = 64.14$ |
| $r_{42} = \infty$ | $d_{42} = 1$ | | |
| $r_{43} = \infty$ (Image plane) | | | |

| | WE | ST | TE |
|---|---|---|---|
| Zooming Data (IO = ∞) | | | |
| f (mm) | 35.5 | 59.2 | 98.5 |
| $d_4$ | 12.15811 | 12.15811 | 12.15811 |
| $d_9$ | 3.6 | 18.8028 | 34.98754 |
| $d_{18}$ | 38.24231 | 17.07717 | 1.8 |
| $d_{25}$ | 1.83713 | 4.31757 | 8.39435 |
| $d_{32}$ | 8.05722 | 5.57678 | 1.5 |
| $d_{40}$ | 40.08196 | 46.03889 | 45.11561 |
| Zooming Data (IO = 1.1 m) | | | |
| f (mm) | 35.5 | 59.2 | 98.5 |
| $d_4$ | 1.4 | 1.4 | 1.4 |
| $d_9$ | 14.78495 | 29.98775 | 46.17249 |
| $d_{18}$ | 38.24231 | 17.07717 | 1.8 |
| $d_{25}$ | 1.83713 | 4.31757 | 8.39435 |
| $d_{32}$ | 8.05722 | 5.57678 | 1.5 |
| $d_{40}$ | 40.08196 | 46.03889 | 45.11561 |

FIGS. 5, 7, 9 and 11 are diagrammatically illustrative of aberrations of Examples 1, 2, 3 and 4 upon focusing on an object point at infinity, and FIGS. 6, 8, 10 and 12 are diagrammatically illustrative of aberrations of Examples 1, 2, 3 and 4 upon focusing on the nearest object point. In these aberration diagrams, (a), (b) and (c) stand for spherical aberrations, field curvature, distortion and chromatic aberration of magnification at the wide-angle end, in the intermediate setting and at the telephoto end, respectively, with "FIY" indicating the maximum image height.

Tabulated below are the values of conditions (1) to (9) in Examples 1 to 4.

| | Ex. 1 | Ex. 2 | Ex. 3 | Ex. 4 |
|---|---|---|---|---|
| Condition (1) | 22.498 | 14.604 | 20.429 | 20.902 |
| Condition (2) | 0.897 | 0.920 | 0.893 | 0.893 |
| Condition (3) | 44.81 | 26.75 | 44.81 | 44.81 |
| Condition (4) | 0.392 | −0.043 | 0.499 | 0.434 |
| Condition (5) | 1.51633 | 1.51633 | 1.51633 | 1.51633 |
| Condition (6) | 1.51633 | 1.67003 | 1.51633 | 1.51633 |
| Condition (7) | 28.82 | 28.82 | 28.82 | 28.82 |
| Condition (8) | 1.324 | 1.277 | 1.298 | 1.303 |
| Condition (9) | 81.54 | 81.54 | 81.54 | 81.54 |
| | 94.93 | 81.54 | 94.93 | 94.93 |
| | 81.54 | 81.54 | 81.54 | 81.54 |

More preferable ranges of conditions (1) to (9) are set out below. Notice that in a plurality of numerical values given, the rightmost one is most preferable.

| Condition | Lower Limit | Upper Limit |
|---|---|---|
| (1) | 12 | 40/30/25 |
| (2) | 0.8 | 1.0 |
| (3) | 22.5/25 | 47.5/45 |
| (4) | −0.3/−01 | 0.5 |
| (5) | 1.50 | 1.60 |
| (6) | 1.50 | 1.68 |

-continued

| Condition | Lower Limit | Upper Limit |
|---|---|---|
| (7) | 25 | 30 |
| (8) | 1.2 | 1.4 |
| (9) | 75/80 | 100/95 |

Figure 13:
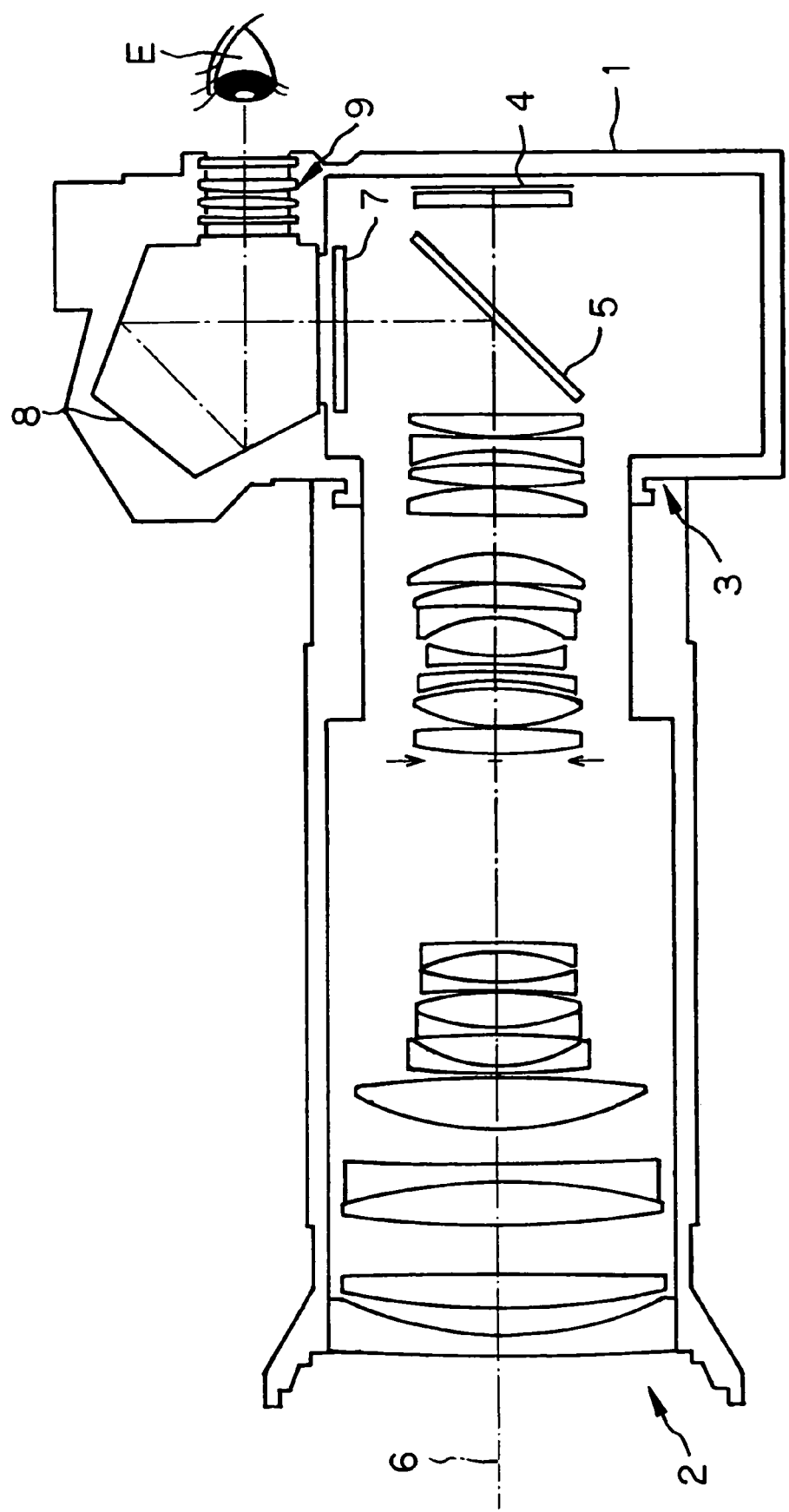
FIG. 13 is a sectional illustration of a single-lens reflex camera using the inventive zoom lens.

FIG. 13 is a sectional illustration of a single-lens reflex camera that is an exemplary imager wherein the inventive zoom lens is incorporated, and a small-format CCD or C-MOS is typically used as an image pickup device. In FIG. 13, reference numeral 1 stands for a single-lens reflex camera, 2 a taking lens system mounted in a lens barrel having a zooming mechanism and a focusing mechanism, and 3 a lens barrel mount with which the taking lens system 2 is attachable to or detachable from the single-lens reflex camera 1. For that mount, a screw or bayonet type mount may be used. In this embodiment, the bayonet type mount is used.

Reference numeral 4 represents an image pickup device plane, 5 a quick return mirror located between the lens system on the optical path 6 of the taking lens system 2 and the image pickup device plane 4, 7 a finder screen located on the path of light reflected by the quick return mirror 7, 8 a penta prism, 9 a finder, and E the eye of a viewer (eye point).

The inventive zoom lens, for instance, any one of Examples 1-4, is used as the taking lens system 2 in the single-lens reflex camera 1 of such construction.

According to the invention as set forth above, it is possible to achieve a medium-telephoto zoom lens that is usable as an interchangeable lens for digital cameras of the single-lens reflex type and, albeit being of F2 large aperture, has improved performance and meets reasonable size and cost requirements.

What we claim is:

1. A zoom lens, which comprises a first lens group of positive power, a second lens group of negative power and a third lens group of positive power and in which upon zooming, the first lens group remains fixed and the second lens group and the third lens group are movable, wherein:

the first lens group comprises a subgroup 1A of negative power and a subgroup 1B of positive power, the second lens group comprises a first negative lens, a cemented positive lens, a second negative lens and a third negative lens, and the following conditions (1) and (2) are satisfied:

$$10 < |f_{1A}/f_w| < 50 \quad (1)$$

$$0.7 < |f_2/f_w| < 1.1 \quad (2)$$

where $f_{1A}$ is a focal length of the subgroup 1A, $f_2$ is a focal length of the second lens group, and $f_w$ is a focal length of the whole zoom lens system at a wide-angle end.

2. The zoom lens according to claim 1, wherein the cemented positive lens in the second lens group is a cemented lens of a double-concave negative lens and a double-convex positive lens, and satisfies the following condition (3):

$$20 < \Delta v_2 < 50 \quad (3)$$

where $\Delta v_2$ is an Abbe number difference between the positive lens and the negative lens in the cemented positive lens.

3. The zoom lens according to claim 1, wherein the second lens group satisfies the following condition (4):

$$-0.5 < (r1+r2)/(r1-r2) < 1 \quad (4)$$

where r1 and r2 are paraxial radii of curvature of an object side- and an image side-surface of the second negative lens in the second lens group, respectively.

4. The zoom lens according to claim 1, wherein the subgroup 1A of negative power in the first lens group comprises a negative lens and a positive lens which are separate from each other, wherein the following condition (5) is satisfied:

$$1.48 < n_{d(1AN)} < 1.7 \quad (5)$$

where $n_{d(1AN)}$ is a d-line refractive index of the negative lens in the subgroup 1A.

5. The zoom lens according to claim 1, wherein the second lens group satisfies the following condition (6):

$$1.48 < n_{d(21)} < 1.7 \quad (6)$$

where $n_{d(21)}$ is a d-line refractive index of the first negative lens in the second lens group.

6. The zoom lens according to claim 1, wherein the subgroup 1B of positive power in the first lens group comprises a cemented positive lens of a positive lens and a negative lens, and satisfies the following condition (7):

$$20 < \Delta v_{1B} < 40 \quad (7)$$

where $\Delta v_{1B}$ is an Abbe number difference between the positive lens and the negative lens in the cemented positive lens in the subgroup 1B.

7. The zoom lens according to claim 1, wherein the third lens group comprises a subgroup 3A of positive power, a subgroup 3B of negative power and a subgroup 3C of positive power, wherein each subgroup moves upon zooming.

8. The zoom lens according to claim 7, wherein the subgroup 3B moves upon zooming from a wide-angle end to a telephoto end while a space between the subgroup 3B and the subgroup 3C becomes narrow, and the following condition (8) is satisfied:

$$1.1 < d_{BC}/MC < 1.5 \quad (8)$$

where $d_{BC}$ is an amount of change in an air separation between the subgroups 3B and 3C at the wide-angle end and the telephoto end, and MC is an amount of movement of the subgroup 3C from the wide-angle end to the telephoto end.

9. The zoom lens according to claim 7, wherein the subgroups 3A and 3C move in unison.

10. The zoom lens according to claim 7, wherein the subgroup 3A comprises a positive lens, a positive lens and a negative lens.

11. The zoom lens according to claim 7, wherein the subgroup 3B comprises a negative lens, a cemented negative lens and a positive lens.

12. The zoom lens according to claim 7, wherein the subgroup 3C comprises a positive lens, a positive lens, a negative lens and a positive lens.

13. The zoom lens according to claim 7, wherein at least one positive lens in the subgroups 3A, 3B and 3C satisfies the following condition (9):

$$70 < v_P \quad (9)$$

where $v_P$ is an Abbe number of the positive lens.

14. An imager, comprising the zoom lens according to claim 1 and an image pickup device located on an image side of said zoom lens.

* * * * *